250-201 AU 252 EX CROSS REFERENCE EXAMINER
8212 XR 2,980,332

ELECTRONIC CURVE FOLLOWER AND ANALOG COMPUTER

Filed Oct. 26, 1956 6 Sheets-Sheet 1

INVENTORS:
JOSEPH W. BROUILLETTE, JR.
CHARLES W. JOHNSON,
BY Robert J. Steinmeyer
THEIR ATTORNEY.

INVENTORS:
JOSEPH W. BROUILLETTE, JR.
CHARLES W. JOHNSON,
BY Robert J. Steinmeyer
THEIR ATTORNEY.

ELECTRONIC CURVE FOLLOWER AND ANALOG COMPUTER

Filed Oct. 26, 1956

INVENTORS:
JOSEPH W. BROUILLETTE, JR.
CHARLES W. JOHNSON,
BY Robert J. Steinmeyer
THEIR ATTORNEY.

ELECTRONIC CURVE FOLLOWER AND ANALOG COMPUTER

Filed Oct. 26, 1956 6 Sheets-Sheet 4

INVENTORS:
JOSEPH W. BROUILLETTE, JR.
CHARLES W. JOHNSON,
BY Robert J. Steinmeyer
THEIR ATTORNEY.

INVENTORS:
JOSEPH W. BROUILLETTE, JR.
CHARLES W. JOHNSON,

BY Robert J. Steinmeyer
THEIR ATTORNEY.

INVENTORS:
JOSEPH W. BROUILLETTE, JR.
CHARLES W. JOHNSON,
BY Robert J. Steinmeyer
THEIR ATTORNEY.

United States Patent Office 2,980,332

Patented Apr. 18, 1961

2,980,332

ELECTRONIC CURVE FOLLOWER AND ANALOG COMPUTER

Joseph W. Brouillette, Jr., and Charles W. Johnson, Syracuse, N.Y., assignors to General Electric Company, a corporation of New York Filed Oct. 26, 1956, Ser. No. 618,504

9 Claims. (Cl. 235—189)

This invention relates to an electronic curve follower which can also be used as a simulator or analog computer. More particularly the invention relates to an electronic simulator or analog computer which can resolve, synthesize and operate upon vector quantities and which is, for example, adapted to be used as a curve follower, as an element of a form recognition system, as a means of measuring various properties of curves, as a device for performing certain curve transformations and for preparing computer or control program, or as an arbitrary function generator or the like.

Electro-mechanical curve following devices have in the past been used for such purposes as the automatic control of various machine tools. Typically, such devices comprise a photoelectric curve reading head mounted upon a mechanical support, the motion of which is controlled by an error signal developed by the photoelectric reader. The motion of the head may then be used to derive information to control any desired machine tool. While these devices are well suited to their intended purpose, the electro-mechanical nature of the system imposes a very distinct limit on the speed at which a given curve may be read, which, in other applications, is often undesirable.

An electronic curve follower, commonly known as the "photoformer," has been used for some time in the analog computing arts as an arbitrary function generator. This system comprises an opaque mask which is placed over the lower portion of the face of a cathode ray tube. The upper edge of the mask represents, in an orthogonal $x$—$y$ coordinate system corresponding to the horizontal and vertical deflection axes of the tube, a plot of the function $y=f(x)$ which one desires to generate. A linear saw-tooth deflection voltage is applied to the horizontal plates of the tube to generate the independent variable $x$, and a bias voltage is applied to the vertical plates to initially position the spot of light formed by the electron beam at the top of the face of the cathode ray tube. A photocell is positioned to pick up the light emitted from the face of the tube and to develop a voltage proportional to the intensity of this light. This voltage is applied to the vertical deflection plates in opposition to the bias voltage, so that the system is maintained in equilibrium when the spot of light rides along the upper edge of the opaque mask. The net voltage on the vertical deflection plate of the tube as the beam is swept horizontally by the linear $x$ deflection voltage is then an analog representation of the function $y=f(x)$, the functional relationship being as determined by the contour of the upper edge of the mask.

While the photoformer is capable of operating speeds far greater than those of electro-mechanical curve followers, it obviously is not capable of following completely around all closed curves or even of following an open-ended curve which may be multiple valued. This, of course, follows from the fact that the linear saw-tooth used as the horizontal or $x$ deflection sweep permits the system to trace out only open-ended, single-valued curves.

There are many applications wherein it would be desirable to have a curve following system which has both the high operating speeds of an electronic device and the flexibility as to the nature of the curve which may be read which is presently found only in electro-mechanical systems. These applications include, for example, form recognition or document reading systems, curve measuring systems, arbitrary function generators, and numerous applications in the control and computing arts, such, for example, as program preparation and curve transformation. This desired speed and flexibility is most readily achieved by the use of a novel electronic analog computer or simulator which can operate on vector quantities which may, for example, represent various geometrical properties of curves. As will become apparent, this computer may be used not only to follow and to analyze the properties of, or to recognize, a given input curve, but also to generate an unknown output curve or trajectory from an input of arbitrarily selected properties which one may desire a curve to have.

It is therefore an object of this invention to provide a novel electronic curve follower which is capable of following either closed or open-ended curves which may be either single or multiple valued.

It is a further object of this invention to provide such a curve follower which will generate voltages representing various geometrical and mathematical properties of the curve being read.

It is a further object of this invention to provide a novel electronic analog computer adapted to resolve, synthesize, and operate upon vector quantities.

It is a further object of this invention to provide electronic apparatus for simulating the motion of a particle acted upon by various forces.

It is a still further object of this invention to provide various novel circuits adapted for use in such an electronic simulator, curve follower, and analog computer.

Briefly stated, in accordance with one exemplary embodiment of the invention, light from the screen of a cathode ray tube of a flying spot scanner is focused on a curve display means which may be a transparent member having opaquely drawn thereon the curve to be investigated. The light transmitted by the member is refocused on a photoelectric cell or transducer. The spot of the scanner is caused to execute any convenient search raster which may, for example, be of the type commonly used in television receivers, and which is clamped or stopped as soon as the light to the photocell is interrupted by the spot intersecting the curve. Superposed on the original search voltages, and continuing after they are clamped, are voltages generated at a constant carrier frequency and so related to each other as to cause the spot to execute a search circle the diameter of which is small compared to the dimensions of the curve in question. The intersection of the search circle with the curve produces two pulses per cycle of the carrier. These pulses may be amplified, filtered and processed by the rest of the analog computer loop, for which the search circle generator voltages provide a phase reference, to produce voltages representing horizontal and vertical components of a correction vector, which voltages may be applied to the deflection system of the cathode ray tube so as to cause the center of the search circle to be servo-controlled to follow around the perimeter of the curve at constant speed. In effect the computer gives the center of the search circle a virtual inertia or mass and causes it to simulate a particle moving along the curve at constant speed. Under these conditions, it can be shown that the acceleration of the center of the search circle is directed along the normal to the curve and is proportional to the curvature of the curve being read. Other voltages, representing various other properties of the curve, are also available in the system and may be used for any of the purposes indicated above. When the system is used to generate a curve, the feedback loop of information from the curve display means through the photoelectric transducer is opened, and arbitrary voltage functions representing desired curve properties are introduced into the system which then causes the curve having the desired properties to be traced out on the screen of the cathode ray tube which, of course, may be photographed or otherwise observed.

While the novel and distinctive features of the invention are particularly pointed out in the appended claims, a more expository treatment of the invention, in principle and detail, together with additional objects and advantages thereof, is afforded in the following description and accompanying drawings of a representative embodiment wherein like reference characters are used to indicate like parts throughout, and in which;

Figure 1 is a block diagram of an exemplary embodiment of the electronic curve follower and analog computer of the present invention.

Figures 2 through 9, 10*a*, 10*b*, 10*c*, 10*d*, 10*e*, 10*f* and 10*g* are diagrammatic illustrations of various geometrical and electrical relationships involved in the operation of the system of Figure 1.

Figure 11 is a schematic circuit diagram of a phase detector used in the system of Figure 1.

Figures 12*a* and 12*b* are time versus voltage waveform plots showing certain phase relations existing in the circuit of Figure 11.

Figure 1:
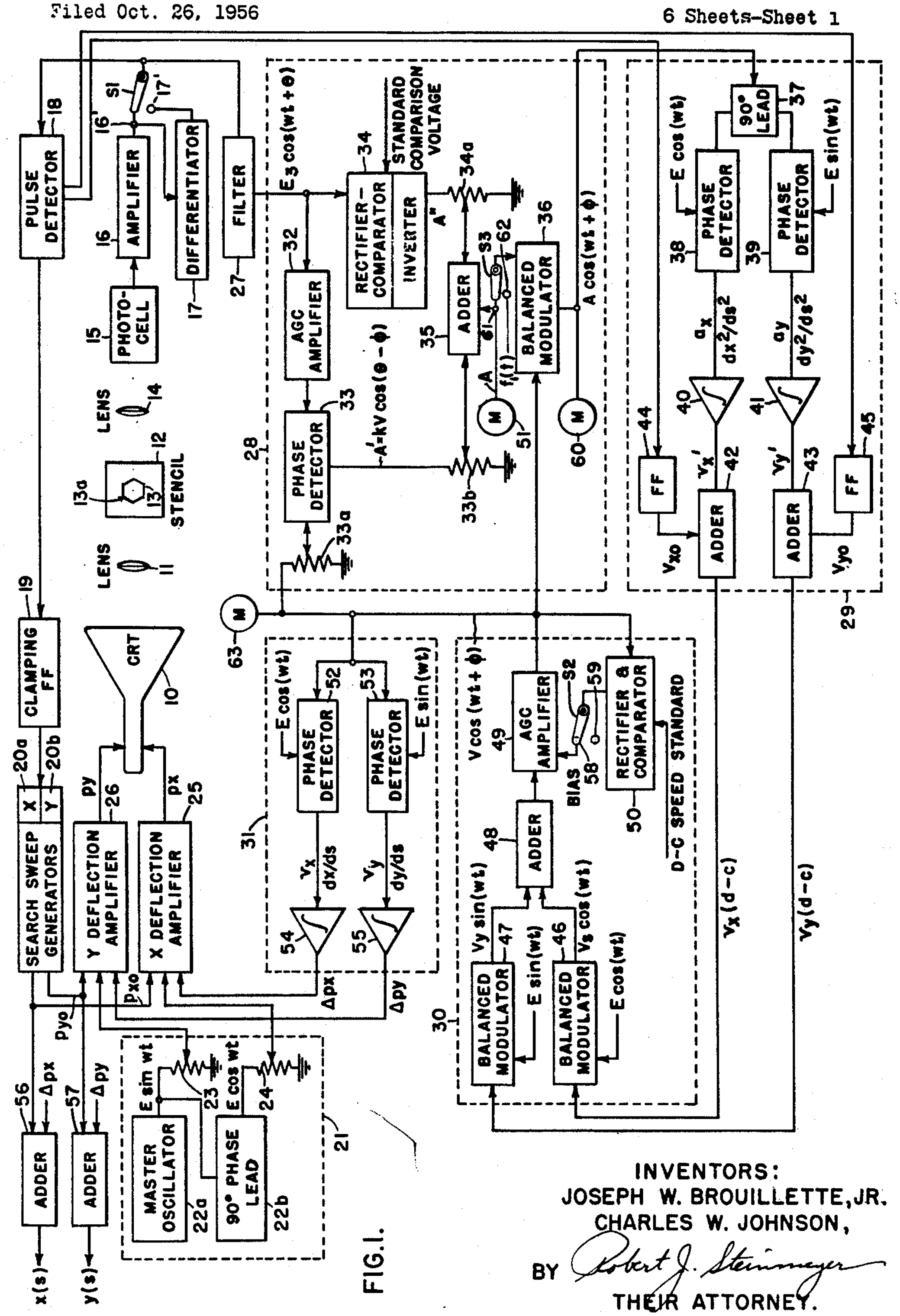

Turning now to the drawings, Figure 1 is a block diagram of the system including an electron beam device here shown as a conventional cathode ray tube 10. Tube 10 is equipped with any convenient deflection system which imparts vertical and horizontal components of motion to the electron beam in the tube in accordance with voltages applied to the deflection system. The deflection of the electron beam, of course, controls the position of the spot of light seen on the face of the tube when the electron beam strikes the phosphor screen thereof. The deflection system may, for example, be of the electrostatic type having horizontal and vertical deflection plates, as shown diagrammatically in Figure 2. It is convenient, for the purposes of this specification, to consider the horizontal deflection voltage as representing the value of the $x$ coordinate, and the vertical deflection voltage as representing the value of the $y$ coordinate of the spot S in a right-handed, orthogonal Cartesian coordinate system having its center or origin at the center C of cathode ray tube 10, and having its axes oriented along the tube's deflection axes. The position on the screen of the spot of light, S, at any instant may then be represented by a position vector $\underline{P}$ having an $x$ component, $p_x$, and a $y$ component, $p_y$. Such a representation logically assumes that the deflection system of tube 10 is linear in the relation between applied voltage and amount of deflection. In fact this linearity is not necessary in all applications of the device, but the explanation of the system is clarified by making this assumption for the present.

As is well known in the art, any vector quantity may be specified either by stating the value of magnitude of its two orthogonal components or, alternatively, by stating the direction angle and the scaler value, that is, the magnitude or length of the vector itself. By the direction angle of the vector is meant the angle between the vector and a reference vector which is, by convention, taken to lie along the $x$ axis. For the purposes of this specification a directional vector quantity will be indicated by a capital letter underlined, whereas the scaler value or magnitude of the vector quantity will be indicated by the same capital letter without underlining. Orthogonal components will be indicated by corresponding small letters with appropriate subscripts. In other words, the position of the spot S shown in Figure 2 at the end of position vector $\underline{P}$ may be uniquely defined either by stating the values $p_x$ and $p_y$, the orthogonal components along the $x$ and $y$ axes respectively, or by stating the length or scaler value, P, and the value of the direction angle $\lambda$ between $\underline{P}$ and the $x$ axis. The latter form is generally called a polar representation of the vector, whereas the former is known as a component representation of the vector. Either one of the two equivalent ways of defining the same vector quantity may be more convenient than the other for a particular purpose. The process of transformation from the polar to the orthogonal component form of vector representation is commonly known as "resolving" the vector into its orthogonal components. The converse process of transforming from the component to the polar form may be termed "synthesizing" the vector.

Figure 3:
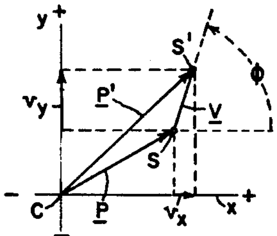

If spot S moves in a straight line to a position S' in one unit of time, as shown in Figure 3, the new position may then be similarly specified by the vector $\underline{P'}$. Additionally, the velocity of motion of the spot from S to S' may be specified by a vector $\underline{V}$. Vector $\underline{P'}$ of course, is the vector drawn from the origin C to the new position S'. Velocity vector $\underline{V}$, on the other hand, which in general equals $\Delta\underline{P}/\Delta t$, is here the vector drawn from S to S' since $\Delta t$ was specified to be one unit of time. The magnitude or length of $\underline{V}$ represents the average linear velocity or speed of the spot which, as is well known, is equal to the distance traveled divided by the time. The velocity vector $\underline{V}$, however, also has a direction as well as a magnitude. This direction may be stated by specifying the angle between the vector $\underline{V}$ and the $x$ axis or, equivalently, the angle $\phi$ between vector $\underline{V}$ and a line parallel to the $x$ axis.

Thus, as with the position vector, the velocity vector may be completely specified by stating its magnitude and its direction angle. Similarly, it, like the position vector, may alternatively be specified by stating the value of its $x$ and $y$ components, $v_x$ and $v_y$, which are the projections of the vector $\underline{V}$ on the $x$ and $y$ axes respectively as shown in Figure 3. As is well known, the magnitude of these $x$ and $y$ component values may be found from the vector $\underline{V}$ from the relations, $$(1a) \qquad v_x = V \cos \phi$$

$$(1b) \qquad v_y = V \sin \phi$$

It is apparent that if the spot S moves in a straight line at constant speed, the vector $\underline{V}$ will remain constant in both magnitude and direction. If the speed changes along the same straight line, the magnitude of $\underline{V}$ will change but its direction angle will remain constant. If the magnitude of $\underline{V}$ remains unchanged while the spot moves in a curve rather than in a straight line, then only the direction angle $\phi$ changes and the spot may be said to be traveling along the curve at constant speed, V. Of course, both the magnitude and direction of $\underline{V}$ may, in general, change simultaneously.

Just as the change in the position vector $\underline{P}$ in unit time gives the velocity vector $\underline{V}$, so also the change in the velocity vector $\underline{V}$ in unit time gives the acceleration vector $\underline{A}$, which may be found from successive values of $\underline{V}$ just as $\underline{V}$ was found from successive values of $\underline{P}$.

Like the vectors $\underline{P}$ and $\underline{V}$, the vector acceleration $\underline{A}$ may also be specified either by stating its magnitude and direction, or by stating its $x$ and $y$ components, $a_x$ and $a_y$.

If one repeatedly chooses the unit of time to be smaller and smaller, one second, one millisecond, one microsecond, etc., one will approach, in the limit, the instantaneous values of these vectors. This, in effect, is what is done by the well known methods of differential and integral calculus in terms of which the foregoing relationships may be stated as follows:

$$(2) \qquad \underline{V}=d/dt(\underline{P})$$

$$(3) \qquad \underline{A}=d/dt(\underline{V})$$

That is, velocity equals the derivative or rate of change of position with respect to time, and acceleration equals the derivative or rate of change of velocity with respect to time. Furthermore, since integration is the inverse of differentiation, it follows from the above relations that, $$(4) \qquad \underline{V}=\int \underline{A}dt$$

$$(5) \qquad \underline{P}=\int \underline{V}dt$$

That is, velocity equals the integral of acceleration with respect to time and position equals the integral of velocity with respect to time. The computation of either the derivative or the integral of a vector quantity is an example of what is commonly termed performing an "operation" on the vector.

Figure 2:
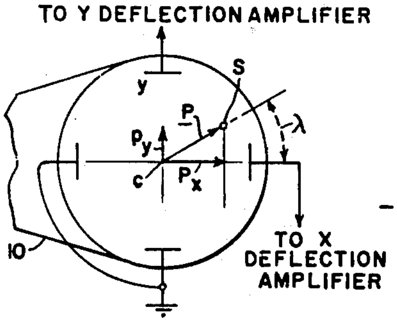

The voltages which are actually applied to the horizontal and vertical deflection plates of tube 10 from deflection amplifiers 25 and 26 have values which represent or, in other words, which are proportional to the components, $p_x$ and $p_y$, of position vector $\underline{P}$. That is, one volt, for example, may cause a deflection of the spot S of one centimeter (or some other unit of distance) on the face of tube 10 along the axis perpendicular to the deflection plate to which the voltage is applied. The factor of proportionality is commonly termed a "scale factor." As shown in Figure 2, a positive voltage from the $x$ deflection amplifier will move the spot a distance $p_x$ to the right along the $x$ axis, and a positive input from the $y$ deflection amplifier will move the spot a distance $p_y$ upwardly along the $y$ axis. If both components are applied simultaneously, the net result is to move the spot S to the end of position vector $\underline{P}$. Of course, negative voltages would move the spot in opposite directions respectively. Since the amount and direction of the deflection are proportional respectively to the magnitude and polarity of the applied deflection voltages, these voltages are herein called position voltages $p_x$ and $p_y$, respectively, as shown in Figures 1 and 2.

In a similar fashion, voltages which, when applied as inputs to electronic integrators, produce output voltages which are these above defined position voltages, will be called velocity voltages. Likewise, if a voltage applied as an input to an electronic integrator produces an output which is a velocity voltage, then the input will be called by an acceleration voltage. Along any one axis of tube 10, a constant acceleration voltage, when integrated, produces an increasing velocity voltage. If the velocity voltage in turn is integrated it produces a more rapidly increasing position voltage, and the spot is caused to move. In the present system, as the values of voltages $p_x$ and $p_y$ change simultaneously, so will the value of vector $\underline{P}$ and the spot of light will move on the face of tube 10 in accordance with the change in $\underline{P}$ which is determined by the integrations or other operations which have been performed on acceleration and velocity voltages. The integrators used for the above operations may be of the type commonly used in the art as described, for example in the book "Electronic Analog Computers" by G. A. Korn and T. M. Korn, published by McGraw-Hill, New York, N.Y., 1952.

When the system is first turned on by applying conventional power supplies, not shown, the voltages $p_x$ and $p_y$ are derived, via the deflection amplifiers, from horizontal and vertical search sweep generators, **20*a* and 20*b*, and from a search circle generator 21. The sweep generators 20*a* and 20*b*** may, for example, be of the type commonly used in television receivers having sawtooth output voltages such that the spot starts at the upper left hand corner of the tube face, sweeps horizontally across at a rapid rate, flies back more rapidly and sweeps horizontally across the tube again, meanwhile moving downward at a slower rate. It should be understood, however, that the particular pattern of this initial search sweep is not critical and that any convenient pattern other than the television raster type suggested above could also be used to initially find the curve. Of course, a manual adjustment of potentiometers through which voltages are applied to the deflection system from sources of constant voltage may also be used, if desired, to initially position the spot on or near the curve to be read.

Figure 4:
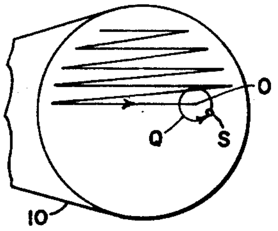

In addition to the voltages from search sweep generators **20*a* and 20*b*, voltage from a search circle generator 21 are also applied to the $x$ and $y$ deflection amplifiers 25 and 26. The deflection amplifiers, as is well-known in the art, are such that their voltage output is proportional to the sum of a plurality of individual voltage inputs. The voltages from circle generator 21 are such that, acting alone, they would cause the spot to execute a small search circle the diameter of which is extremely small by comparison to the area of the tube face. In practice this diameter may, for example, be of the order of magnitude of a few millimeters. The exact size of the search circle is not critical, however, as will appear below. As digrammatically shown on an enlarged scale in Figure 4, the addition of these two pairs of voltages in the deflection amplifiers causes the spot of light S to continuously rotate in a small circle Q the center O of which is initially deflected in a search sweep pattern or raster as determined by the voltages from generators 20*a* and 20*b***. If it is desired to avoid excessive cardiodal distortion of the circle while its center is in motion, the speed of the motion of the spot around the circle should be large by comparison to the speed of the motion of the center of the search circle.

Figure 5:
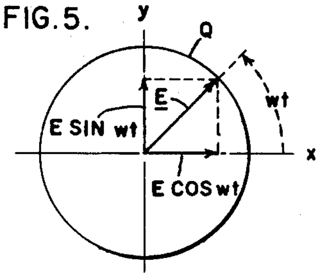

Search circle generator 21 may conveniently comprise a master oscillator **22*a*, which is preferably a crystal controlled oscillator, but may be any convenient means for generating a stable alternating voltage output of the form $E \sin wt$, which is applied through potentiometer 23 to the $y$ deflection amplifier 26**. Here, E is the magnitude, that is, the peak or maximum value of the voltage, $w$ is the angular frequency of the voltage, and $t$ is time. Also, $w$ equals $2\pi f$, where $2\pi f$ radians equals 360°, and where $f$ is the frequency of alternation of the voltage in cycles per second. As shown diagrammatically in an enlarged scale in Figure 5, such an alternating or A.C. voltage, $\underline{E} \sin wt$, represents the vertical or $y$ component of a voltage vector $\underline{E}$ rotating counterclockwise at a frequency, $f$ equal to $w/2\pi$. At time, $t$, equal to zero, the vector $\underline{E}$ will lie along the $x$ axis and, in general, at any time, $t$, it will be at an angle, $wt$, to the $x$ axis. When time $t$ equals $2\pi/w$, vector $\underline{E}$ will have made one complete revolution corresponding to one cycle of the A.-C. voltage. Like any other vector, $\underline{E}$ has orthogonal $x$ and $y$ components which must be alternating in value in order to cause its rotation and which are respectively $\underline{E} \cos wt$ and $\underline{E} \sin wt$.

The output, $\underline{E} \sin wt$, of master oscillator **22*a* is applied, as noted above, to the $y$ deflection amplifier 26. In order to obtain the $x$ component of the vector $\underline{E}$, this output is also applied to an element 22*b* which may be any conventional network that causes a phase lead of 90° or $\pi/2$ radians of its output voltage with respect to its input voltage. Element 22*b*, therefore, has an output voltage, $E \sin (wt+\pi/2)$, which, as is well known, is equal to $E \cos wt$. This output is the required $x$ component of vector $\underline{E}$ and is applied through potentiometer 24 to the $x$ deflection amplifier 25 of tube 10**. The combined effects of the voltages $E \sin wt$ and $E \cos wt$ on the deflection system and electron beam of the cathode ray tube reconstruct or synthesize the rotating vector $\underline{E}$ from its orthogonal components, and cause the spot to execute the small search circle Q the center of which is moved in the television type raster.

The image of the face of the tube 10 on which the spot of light S is moving is focused by a lens 11 on a curve display means which may comprise a stencil or other member 12 on which is impressed a curve 13 that, in Figure 1, is shown, by way of example only, as being the outline of a regular hexagon. Stencil 12 may be transparent or translucent and curve 13 opaque, in which case the light transmitted by the stencil is collected by a second lens 14. If member 12 is opaque and reflecting, curve 13 may conveniently be its only non-reflecting portion, in which case lens 14 is positioned on the same side of the stencil as lens 11 in order to collect the reflected light.

Of course, it should be understood that any equivalent arrangement could be used. In particular, the transparent and opaque, or reflecting and non-reflecting portions of member 12 may be interchanged. Member 12 may, for example, be either a positive or negative photographic film, or a portion of an intermittently moved roll of microfilm. In any of these arrangements, the curve 13 is defined by the boundaries between adjacent regions of member 12 which have different optical properties. Such a boundary exists, for example, along a line separating regions of different optical density, grey scale, or transparency in a photographic negative. In general such a line represents an equi-density or constant grey level line and the gradient or rate of change of density or grey level may be either continuous throughout the area including the line, or (in the special case of two tone or black and white images) the line may correspond to a discontinuity in the grey scale. For purposes of clarity of discussion the latter special case of black and white or two tone definition will be assumed in the remainder of the specification. It should however, be understood that the system may be used to read either type of material. If the system is used to follow along an equidensity line in an image having a continuous density gradient or variation of grey level, the only difference in operation is that the output of the photoelectric transducer (to be described in detail below) becomes a continuously varying waveform such as a sinusoid rather than a series of pulses. Both types of output, however, contain essentially the same information as will become apparent from the discussion below.

The curve display means and the search surface on which the spot of the electron beam device is focused are positioned in what may be termed "reciprocally imaged relationship." By this term is meant that if the search surface, which may for example be the screen of the cathode ray tube 10, is considered as an object then it will be imaged on the curve display means and conversely if the curve display means is considered as an object then it will be imaged on the search surface in accordance with well known laws of optics. Of course, the limiting case of "reciprocally imaged relationship" occurs when the curve display means is a mask or other display medium placed immediately on or adjacent the search surface so that points on the curve display means and points on the search surface directly have the one-to-one correspondence which in other arrangements is achieved by the use of an intervening lens.

The light collected from member 12 by lens 14 is focused on a photoelectric transducer, such as a photocell 15. Of course, tube 10, lenses 11 and 14, curve display means 12, and photocell 15 may be enclosed in any convenient housing to exclude ambient or extraneous light. Transducer or photocell 15 may, for example, be a device the current flow through which is determined by the amount or intensity of light incident on it. When this current is caused to flow through a resistor, a voltage output may be derived. Since the cathode ray tube 10 is operated at constant beam or spot intensity, the intensity of light falling on photocell 15 will be constant, as will its voltage output, when the spot of light is traversing the background portion of the curve display means no matter whether the background is light transmissive or not. When the spot crosses curve 13, however, the intensity of light to the photocell is varied to its opposite extreme and a voltage pulse will appear in its output. If the background of curve display means 12 is such that light is transmitted, that is, if it is either transparent or reflecting, and curve 13 is not, the pulse will be negative going. If curve 13 is light transmissive and the background of display means 12 is not, the pulse will be positive going. In either arrangement, the voltage pulses may be amplified by an amplifier 16.

It should also be noted that cathode ray tube 10 could, alternatively, be an image dissector, image orthicon, vidicon, or any other suitable type of camera tube which may preferably be provided with any convenient electrostatic deflection system. The function of photoelectric transducer 15 would then, of course, be incorporated as a part of the operation of such a camera tube and the video output signal of the tube would supply the pulse input signal to amplifier 16. If magnetic deflection is used it is necessary to derive the deflection currents from a constant current source driven by the specifically illustrated deflection voltage signals. Of course, where electrostatic deflection is used the voltages shown herein would simply be applied directly to the deflection system of the camera tube.

Furthermore, if curve 13 is deposited on curve display means 12 in a medium which is opaque to electrons (such as an ink containing a dispersion of lead) then an electron beam from any convenient source may be directly focused on one side of the curve display means as a search surface in which case the photoelectric transducer would be replaced by any convenient transducer having a voltage output which is a function of the incidence of electrons on the transducers. Such an arrangement is another illustration of the limiting case of "reciprocally imaged relationship" previously discussed in connection with the use of a mask. In any arrangement it is only necessary that the search surface on which the beam of an electron beam device is focused to a spot, the position of which may be controlled by suitable deflection means, be placed in one-to-one correspondence or "reciprocally imaged relationship" with a curve display means. This may be accomplished either by the physical identity of the two surfaces, by placing them immediately adjacent each other as when only the glass end face of a tube intervenes, or by interposing suitable optical means between the two surfaces. A transducer is then required having an output which depends upon the positioning of the spot in one or another of the portions of the area of the search surface which correspond to one or another of the regions of the curve display means so that a change in the output of the transducer will indicate that the spot has crossed the boundary between these regions, or in other words has crossed the curve being displayed.

Figure 14:
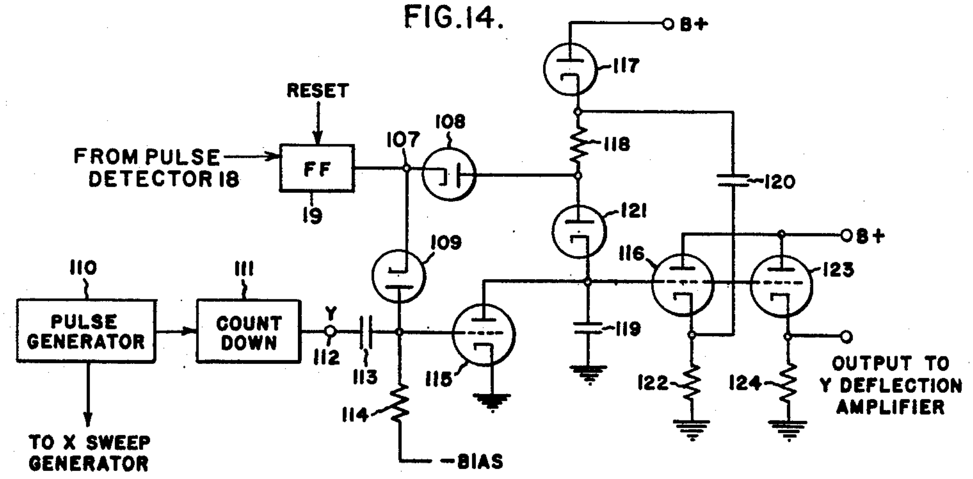
Figure 14 is a schematic circuit diagram showing means for clamping the television type search sweep generators shown in block form in Figures 1 and 13.

Returning now to the embodiment of the invention specifically illustrated and assuming, for the moment, that as shown in Fig. 1, switch-arm $S_1$ is connected to terminal 16′, the output of amplifier 16 is then applied to a pulse detector 18. The pulse detector may, for example, comprise a band pass filter which will not pass the steady direct current or D.-C. output voltage of amplifier 16, but which will pass the pulse output. This filter is followed by a rectifier or any other convenient means to derive a D.-C. signal from this pulse output. The output of the rectifier is applied to a clamping "flip-flop" or bistable circuit 19 which, when triggered or actuated by signal from pulse detector 18, controls any convenient circuitry to "clamp" the search sweep generators 20*a* and 20*b* at the values which they have at that time. One specific example of circuitry for doing this is shown in Fig. 14 which will be described below. By this clamping action, the variation or oscillation in value of the voltage output of generators 20*a* and 20*b*, which initially causes motion of the center of the search circle Q, is stopped, and these voltages are then held fixed at the values, $p_{xo}$ and $p_{yo}$, which they have when the spot first encounters curve 13. The output from pulse detector 18 is also applied to a pair of flip-flops 44 and 45 which introduce initial velocity voltage conditions $v_{xo}$, $v_{yo}$ into the system to start motion of the center O of search circle Q around curve 13 in a manner to be described below.

At the instant when the inputs from sweep generators 20*a* and 20*b* are clamped to the constant values, $p_{xo}$ and $p_{yo}$, in a manner which will be shown and described in detail hereinafter, the $x$ and $y$ inputs, $E \cos wt$ and $E \sin wt$, from generator 21 cause the spot to move in a search circle Q having its center O located at a point on the face of the cathode ray tube, the coordinates of which are $p_{xo}$ and $p_{yo}$. This is apparent from the discussion above and from comparison of Figs. 2 and 5. If the component $p_x$ consisted only of the voltage $E \cos wt$, and if the component $p_y$ consisted only of the voltage $E \sin wt$, the position vector $\underline{P}$ of Fig. 2 would originate at the center C of tube 10 and would have a magnitude proportional to the magnitude of vector $\underline{E}$ of Figure 5. But we have seen that $\underline{E}$ is a rotating vector of constant amplitude, the tip of which traces out a circle, and therefore it follows that the inputs from the circle generator 21 will cause the spot S to rotate in a circle. If the deflection means used are linear, the magnitude of the radius of this circle will be determined by the absolute value or magnitude of $\underline{E}$, which conveniently may be made negligibly small by comparison to the length of curve 13 by suitable equal settings of potentiometers 23 and 24. Of course, suitable adjustment may be made in the magnitude and phase of the outputs of the circle generator so that the particular deflection means used will cause the spot to rotate in a circle. For the present, however, we assume, as noted above, that the deflection system is linear in the relation between deflection and applied voltage at least to within the degree of precision desired for the overall system.

The frequency of rotation of the spot S around the circle will be determined by the frequency of master oscillator 22*a* of circle generator 21 which serves as a clock or synchronizing phase reference for the entire system. The center O of circle Q will not in general be at the center C of tube 10, of course, but will initially be held at the fixed position $p_{xo}$, $p_{yo}$ by the clamped voltages from sweep generators 20*a* and 20*b*. The spot S will then rotate about the point $p_{xo}$, $p_{yo}$ near curve 13.

Figure 6:
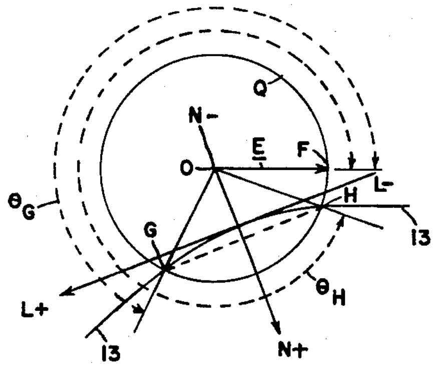

When, as shown in Figure 6, the distance along a perpendicular line or normal ON+ from the center O of search circle Q to a tangent L—L+ to curve 13, is less than the radius OG of the circle Q, the spot S will cross curve 13 twice per revolution around the circle Q, as shown at points G and H. The segment GH of curve 13 shown in Figure 6 may, for example, be an enlarged view of the corner of hexagon 13, indicated by the arrow 13*a* in Figure 1, which is the first point of intersection with the curve if the above suggested television search sweep raster is used. The segment GH is shown rounded since a sharp corner or intersection does not exist in the physical medium in which curve 13 is drawn when it is magnified to the scale of the drawing in Figure 6. It will be recalled that the diameter of search circle Q will normally be of the order of magnitude of a few millimeters. Even if curve 13 does come to a sharp point, however, it is immaterial to the operation of the system, since search circle Q approximates the tangent to the curve segment GH by the dotted line chord GH of circle Q.

It is convenient to consider the tangent L—L+ to be moving in a positive direction when it moves counterclockwise around the curve 13 and to consider the normal to be pointing in a positive direction when it "leads," that is, when it is ahead of the tangent in counterclockwise rotation by 90°. The set of axes formed by L—L+ and N—N+ may be thought of as rotating with respect to the $x$—$y$ axes of the the tube face as the center O of circle Q traces around curve 13.

The spot S, however, rotates around the circle Q at a far more rapid rate than the center O of search circle Q moves around curve 13. In practice, a frequency of rotation of spot S of 450 kilocycles, set by master oscillator 22*a*, has, for example, been found satisfactory. For a single rotation of S around circle Q, the center O of circle Q may be considered to be stationary with respect to the $x$—$y$ axes, or to the position OF as shown in Fig. 6 in which vector $\underline{E}$ lies when time $t=0$, rather than to be moving along a line parallel to L+ around curve 13. That is to say, a single rotation of S around Q may be regarded as taking a still snapshot of the motion of the search circle relative to curve 13 during a very small time interval. Hence the angles $\theta_G$ and $\theta_H$ of the two points G and H at which the spot S intersects the curve 13 may be measured, as shown in Figure 6, with respect to axis OF in the search circle's set of orthogonal axes. Of course, the origin O of the search circle's set of orthogonal axes shown in Fig. 5 will move relative to the origin C of the tube's set of orthogonal axes, but the two sets of axes will always remain parallel to each other so that angular measurements in the two are equivalent. The relationship between these two sets of axes is given at any instant by the position vector from the center C of the tube to the center O of the search circle. Like any other vector, this position vector may be expressed in either polar or rectangular coordinates.

Figure 7:
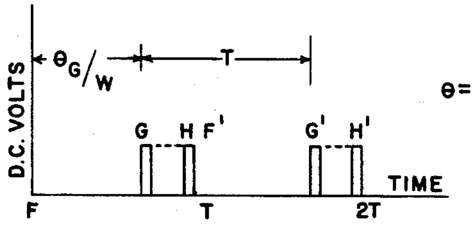

As a result of the two intersections G and H of the spot with the curve, the output of photocell amplifier 16 is a series of pulses as shown in Fig. 7 which is a diagrammatic waveform plot of amplifier output voltage against time. In Figures 6 and 7, time is counted so that $t=0$ at the instant when the spot is at point F, or in other words, when vector $\underline{E}$ is directed horizontally along the $x$ axis. It will be recalled that if $t$ equals 0, the angle $wt$ equal 0, and that the cosine of O equals 1 and the sine of O equals 0. Therefore, at time $t=0$ or, more generally, at time $t=nT$, where T is the time for one rotation and $n$ is any integer, the vector $\underline{E}$ generated by an $x$ component, $E \cos \underline{wt}$, and a $y$ component, $E \sin \underline{wt}$, will have the position $\overline{OF}$ shown in Figure 6. That is to say, the output of circle generator 21 is used to establish a phase reference, or a starting point from which time is counted. If one desired to use digital techniques, the voltage $E \cos (wt)$ could be used to control a pulse generator and cause it to emit a reference pulse when S reaches point F where $E \cos wt$ is a maximum. The pulse output of the photocell would then represent information in a pulse position modulated code modulo 360° on an incremental time basis determined by the period T of the master oscillator. As will be seen below, however, this is not necessary in the analog computer of the present invention, since the pulses are passed through a filter, the output of which then contains the same information in its phase relationship to the output voltage of the master oscillator that would be contained in pulses modulated with respect to a timing pulse emitted when time equals $n$T. As time $t$ increases, the angle $wt$ increases. When $wt$ equals the angle $\theta_G$, the spot S will be at point G, and a pulse G will appear in the output of amplifier 16. Similarly when $wt$ equals $\theta_H$, spot S will be at point H and a pulse H will appear in the output of amplifier 16.

It will be recalled that $w=2\pi f$, where $f$ is the frequency of master oscillator **22*a*. Also $f=1/T$, where T is the period of the oscillator 22*a***, so that $wt=2\pi t/T$. Consequently, when time $t$ equals T, the period of the oscillator, $wt=2\pi$ or 360°, and the rotating vector is back to position OF. This is marked as point F′ at a time T in Figure 7. During the next cycle from T to 2T, a similar pair of pulses G′ and H′ will appear. The time interval from G to G′ is equal to T, and the time interval from H to H′ is also equal to T, which corresponds to an angle of $2\pi$ radians. The time interval from F to G is equal to $\theta_G/w$.

If the curve 13 is not a narrow line, but rather the edge of a filled in or wholly opaque shape or area on display means 12 so that, for example, all of the area below line 13 in Figure 6 is opaque, then the pulses G and H will merge to become leading and trailing edges of a single pulse as shown by the dotted line in Figure 7. If such filled in material is to be read, the switch S1 is thrown to terminal 17′ so that the output of amplifier 16 is applied to a differentiator 17 before being applied to pulse detector 18. Differentiator 17 may be simply a series connected resistor and condenser with output taken across the resistor. As is well known, such a circuit has output whenever its input is changing, and no output when its input is constant. It will consequently produce separate pulses at the leading and trailing edges G and H respectively, of the single merged pulse. If desired, differentiator 17 may also include or be followed by any conventional pulse shaping circuitry to give the separated pulses a uniform shape and polarity when such filled in or solid area material is to be read.

When a closed curve is drawn as a narrow line which itself gives rise to pulses when crossed by the spot, there are, of course, actually three regions on the curve display means, the narrow line itself being one of these regions. The regions interior and exterior to the line will, however, have the same optical properties. Strictly speaking, two curves are defined by such a line, one being the boundary between the line and the exterior region and the other being the boundary between the line and the interior region. The former, of course, corresponds to the curve which would be defined if the area within or interior to the line were filled in as a solid shape and is the curve which will be discussed in detail for purposes of illustration.

In either position of switch S1, appropriate to the type of material being read, pulses G and H will be positioned at points G and H as shown in Figures 6 and 7. Furthermore, the series of pulses G, G′, etc. has, as a fundamental or first harmonic, a sinusoidal voltage component of frequency $f$ equal to $1/T$, as does the series of pulses H, H′, etc. Here, as noted above, T is the period of the master oscillator. For the purpose of this specification both sine and cosine terms will be called "sinusoids" since it is well known that they are equivalent to within a constant 90° term. It can be shown that the sinusoidal fundamental of pulses GG′ etc. can be represented as $E_1 \cos (wt+\theta_G)$, since, as best seen in Figures 6 and 7, this fundamental is of the same frequency as the horizontal deflection voltage, $E \cos wt$, of search circle Q, but is displaced in phase from it by the angle $\theta_G$. That is to say, $E \cos wt$ is a maximum at point F and the sinusoidal fundamental of the pulses G, G′ is a maximum at point G displaced from point F by the angle $\theta_G$ or the time interval $\theta_G/w$. Similarly, the fundamental due to the pulses H, H′ can be represented as, $E_2 \cos (wt+\theta_H)$. The amplitudes $E_1$ and $E_2$ will be equal to each other but will not in general be equal to the amplitude E.

The pulse output voltage from switch S1 is applied to a band pass filter 27 which is designed to reject harmonics above the first and to transmit only voltage components having a frequency equal to the fundamental first harmonic frequency, $1/T$, of the pulses. The output of the filter 27 is a sinusoid consisting of the sum of voltages $E_1 \cos (wt+\theta_G)$ and $E_2 \cos (wt+\theta_H)$. From a well known trigometric formula for the sum of the cosines of two angles and from the fact that $E_1=E_2$, it follows that, $$(6a) \quad E_2 \cos (wt+\theta_H)+E_1 \cos (wt+\theta_G) = [2E_1 \cos \tfrac{1}{2}(\theta_H-\theta_G)] \cos [wt+\tfrac{1}{2}(\theta_H+\theta_G)]$$

This expression, therefore, represents the output voltage of filter 27. For convenience, this latter expression may be rewritten as $$(6b) \quad E_3 \cos (wt+\theta)$$

This is also a sinusoid having an amplitude $E_3$ equal to $2E_1 \cos \frac{1}{2} (\theta_H-\theta_G)$, having a constant angular frequency $w$ equal to that of master oscillator **22*a*, and having a phase angle $\theta$ equal to $\frac{1}{2}(\theta_H+\theta_G)$. Therefore, as center O moves and the position of intersections G and H vary, the amplitude and the phase of the signal output of filter 27** will also vary accordingly.

Figure 8:
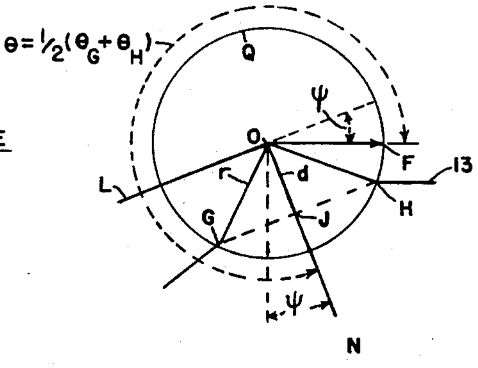
Figure 9:
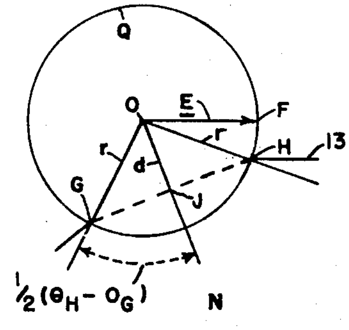

Figures 8 and 9 are similar to Figure 6, but have the segment GH of curve 13 replaced by the chord GH of search circle Q. From Figure 8 is can be seen that the phase angle $\theta$ of the output of filter 27, which equals $\frac{1}{2}(\theta_G+\theta_H)$, represents the direction angle of the normal to, that is, of the line ON perpendicular to, the chord GH, which also bisects angle GOH, and intersects chord GH at point J. The direction phase angle, $\theta$, is again measured counterclockwise from the horizontal reference vector OF or, in other words, from the zero phase reference time established by master oscillator **22*a*. Since the search circle Q is small compared to the length of the curve 13 being traced, and since the time interval of one rotation of S around the circle is small, the chord GH is a good approximation to the segment GH of curve 13, and the phase angle, $\theta$, of the output voltage of filter 27 may be taken to represent the instantaneous direction angle of the normal to curve 13. Phase angle $\theta$ is, therefore, also an indirect measure of the direction angle $\psi$ of curve 13 itself at joint J, as shown by the dashed lines in Figure 8. It will be noted that when the approximation is exact, normal ON to chord GH falls along axis N+, the normal to curve 13, and line OL, the continuation of the side of direction angle $\psi$ of curve 13, is parallel to the tangent or axis $L-L+$. When center O of circle Q is moving counterclockwise around and parallel to curve 13**, the vector velocity $\underline{V}$ of center O will lie along the line OL and will have a phase angle $\phi$ equal to $(\psi+180°)$.

Furthermore, the amplitude, $E_3$, of the output voltage of filter 27, which, as noted above, equals $$[(2E_1 \cos \tfrac{1}{2} (\theta_H-\theta_G)]$$

can be expressed, as best seen in Figure 9, in terms of the ratio of the distance $d$, or line OJ, from the center O of the circle Q to the chord GH and the radius $r$ of the circle Q. This follows from the fact that the angle between radius OG and the normal ON is $\frac{1}{2} (\theta_H-\theta_G)$. The cosine of this angle, by standard definitions, is $d/r$, where $d$ is the line OJ and $r$ is the radius OG or radius OH. Therefore, the amplitude $E_3$ of the output voltage of filter 27 can be expressed as, $$(7) \quad E_3=2E_1\left(\frac{d}{r}\right)$$

It can be seen that this amplitude is a maximum when $d$ equals $r$, that is, when points G and H merge to a single point lying on both curve 13 and circle Q. The amplitude $E_3$ is a minimum when $d$ equals zero, that is when points G and H lie on a diameter of the circle Q, and consequently when the center O of the search circle lies on curve 13. Of course, $E_3$, is also zero if $d$ is greater than $r$, since in this case the circle Q does not intersect curve 13 and pulses are not produced.

The ouput voltage $E_3 \cos(wt+\theta)$ of filter 27 therefore contains in its variable amplitude $E_3$, information as to the distance $d$ from the center O of the search circle Q to curve 13, as approximated by chord GH; and it also contains information in its variable phase angle $\theta$ as to the direction angle of the normal ON drawn from the center O of search circle Q to chord GH. This angle is measured, it will be noted, not in the rotating set of axes L—L+ and N—N+, but in a set of axes having the vector OF as the horizontal or "$x$" axis. Of course the set of orthogonal axes of which vector OF forms a part has its orientation fixed by the output of the master oscillator of the circle generator so that this set of axes will always be parallel to the orthogonal $x$—$y$ axes determined by the horizontal and vertical deflection axes of tube 10. Consequently for angular measurements these two sets of axes are equivalent to each other and phase angle $\theta$ may be considered to be measured in the $x$—$y$ orthogonal axes of tube 10. The information contained in the signal $E_3 \cos(wt+\theta)$ and determined by the curve and the search circle may now be processed or operated on so as to produce voltages which may be used to servo-control the position of the center O of search circle Q so that it will follow along the edge of curve 13 at a small predetermined distance, D, less than the radius $r$ of circle Q and preferably equal to about one-half thereof.

In Figure 1 the portion of the analog computer which performs these operations is shown broken down into different functional sections by the dashed line blocks 21, 28, 29, 30, and 31, the latter four of which will be described in detail below. Block 21, of course, is the search circle generator consisting of master oscillator 22*a* and phase shifting element 22*b*, which have been described in detail above and which have the outputs that are used both to generate the search circle and to serve as carriers and phase reference voltages throughout the entire system.

Broadly speaking, block 28 has as inputs the voltage from filter 27, $E_3 \cos(wt+\theta)$, as defined above, and a voltage, $V \cos(wt+\phi)$, which is fed back from block 30. This latter voltage has an amplitude V and phase angle $\phi$ which represents the actual magnitude and direction of the vector velocity $\underline{V}$ of the center O of the search circle Q. Initial arbitrary values, $v_{xo}$ and $v_{yo}$, of the components of this velocity are set into the system as D.-C. voltages by the same output from pulse detector 18 which simultaneously clamps sweep generators 20*a* and 20*b* when curve 13 is first encountered. Block 28 derives a distance error signal A″ which is proportional to the distance $d$ of the center of the search circle from the curve, and a direction error signal A′ which is proportional to the difference between the direction angle $\theta$ of the normal to curve 13 and the directional angle $\phi$ of the velocity vector $\underline{V}$, of the center of the search circle Q. In order to cause this velocity vector $\underline{V}$ to change its direction to conform to the direction of the curve 13 without changing its magnitude, an acceleration vector $\underline{A}$ having a direction perpendicular to the direction of velocity vector $\underline{V}$, and having a magnitude A proportional to the rate of change of the direction angle $\psi$ of the curve 13 along, or with respect to its arc length, is applied to the velocity vector. Block 28 constructs such an acceleration vector $\underline{A}$ from the sum A of the distance error signal A″ derived from the amplitude of the voltage $E_3 \cos(wt+\theta)$ and the directional error signal A′ derived from the feed-back velocity information and the phase angle $\theta$. Adding in the directional error signal serves to damp out unwanted oscillation in the synthesized acceleration signal. The feed-back velocity voltage is also used to give the acceleration voltage the correct direction at right angles to the velocity. Block 28 has as its output an A.-C. voltage representing this acceleration vector $\underline{A}$. Block 29 resolves this polar vector and integrates the components of the acceleration to corrective velocity components which may be added to the components of the actual velocity $\underline{V}$. The outputs of block 29 are unidirectional or D.-C. voltages of variable magnitude and polarity which represent the $x$ and $y$ components of the corrected velocity.

Block 30 reconverts these $x$ and $y$ components of velocity back to an A.-C. or carrier modulated voltage $V \cos(wt+\phi)$ the amplitude of which represents the magnitude and the phase angle of which represents the direction angle of the velocity vector $V$. Although these are simply two different ways of representing the same vector quantity, it is convenient to reconvert from the D.-C. or component form to the A.-C. or polar form of representation in order to obtain the required feedback voltage necessary to be able to derive the angular or directional error signal. The polar or A.-C. form also facilitates the use of an automatic gain control circuit to fix or constrain the magnitude of the A.-C. velocity-vector voltage which, it will be recalled, determines the speed of the motion of the center of the search circle. This constraint further damps out transient errors. Block 31 takes D.-C. $x$ and $y$ components of the A.-C. velocity-vector voltage, and integrates these components to position vector components or deflection voltages, $\Delta p_x$ and $\Delta p_y$. These deflection voltages are applied to the $x$ and $y$ deflection amplifiers of the cathode ray tube 10 to control the motion of the center of the circle from the point $p_{xo}$, $p_{yo}$ around the perimeter of curve 13. This motion in turn creates the information in the variable amplitude and phase of the output signal $E_3 \cos(wt+\theta)$ of filter 27, thus closing the damped rate servo loop. When the system is used quantitatively as an analog computer the curve 13 is, of course, the input forcing function.

Returning now to a detailed consideration of the system shown in Figure 1, the output voltage of filter 27, $E_3 \cos(wt+\theta)$, is applied, through an automatic gain controlled amplifier 32, to a phase detector 33 to obtain signal A′ and is also directly applied to a rectifier and comparator 34 to obtain signal A″. For purposes of sign or polarity convention, it is convenient to consider amplifier 32 as a two stage or zero phase shift amplifier. Of course, it will be understood that any equivalent consistent sign convention may be adopted and that compensating electrical changes may be made in accordance therewith as will be obvious to those skilled in the art.

For the purposes of this specification, a phase detector may be defined as any device having two sinusoidal input voltages of the same frequency but not necessarily of the same phase, where one of the A.-C. sinusoidal inputs, called a carrier voltage, has an amplitude which is large by comparison to the amplitude of the other A.-C. input, called a signal or modulated voltage; the device further having a D.-C. output voltage the value of which is proportional to the product of the amplitude of the modulated or signal voltage times a factor which is the sine or cosine of the angle of phase difference between the carrier and the signal voltages; the factor, when the signal voltage is a cosine wave, being a sine term if the carrier input is a sine wave and being a cosine term if the carrier input is a cosine wave. Of course, an equivalent relation holds for signal inputs which are sine waves.

Figure 11:
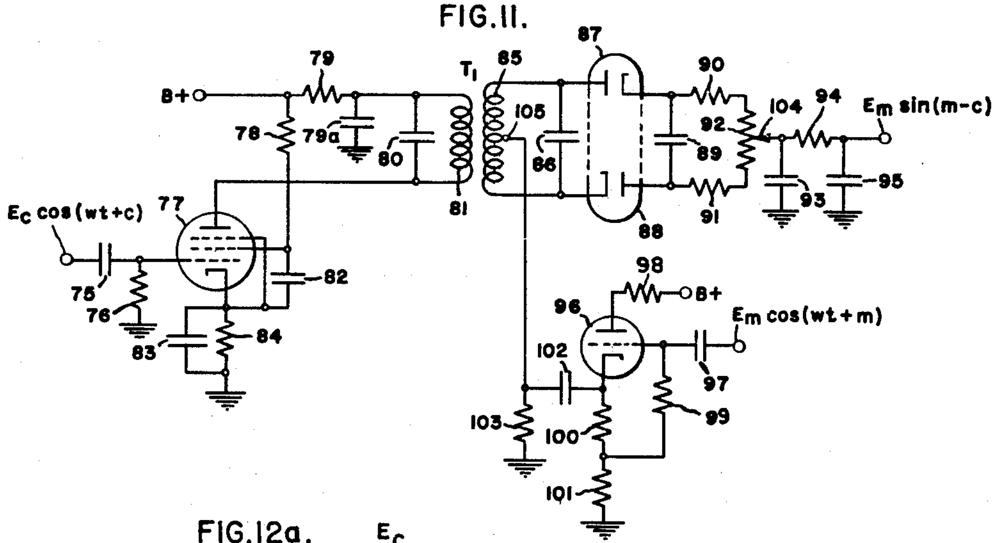

A specific example of such a phase detector is shown in detail in Figures 11 and 12. The timing function which this circuit serves may be performed in pulse or digital networks by such circuits as are, for example, described on pages 370 et seq. of volume 19, "Waveforms" of the Massachusetts Institute of Technology Radiation Laboratory Series, McGraw Hill, 1949. However, as shown in Figure 11, the present circuit is adapted to accept sinusoidal rather than pulse input voltages and to accurately measure or sample the instantaneous value of one sinusoidal input at a time determined by the other sinusoidal input, rather than to select one particular pulse from a series of pulses. In Figure 11 a carrier voltage $E_c \cos (wt+c)$ is applied to the grid of a pentode amplifier tube 77, through a coupling capacitor 75 and resistor 76. Screen grid and plate potentials for the tube 77 are derived from a B+ power supply through resistors 78 and 79 respectively. The plate circuit is decoupled from the power supply by capacitor 79a. Output signal is taken from the amplifier through a transformer $T_1$ having a primary winding 81 connected in series with resistor 79 and the anode of tube 77 and turned, by a capacitor 80, to resonance at the angular frequency, $w$, of the input carrier signal. Capacitors 82 and 83 are by-pass condensers for the screen and for the cathode resistors 78 and 84 respectively. The secondary 85 of transformer $T_1$ is tuned by a capacitor 86 to the same frequency, $w$, to which the primary is tuned. If the transformer is adjusted for critical coupling, then at the resonant frequency there is a 90° phase shift across it. This critical coupling is not necessary to the operation of the stage but is convenient from the point of view of accurate alignment procedures to be described below. One end of secondary winding 85 is connected to the anode of a diode 87 and the other end of secondary 85 is connected to the cathode of another diode 88. A capacitor 89 is connected between the cathode of diode 87 and the anode of diode 88, and resistors 90 and 91 and the potentiometer 92 are connected in series across the capacitor 89. A capacitor 93 is connected from the wiper arm 104 of potentiometer 92 to ground. Output is taken across capacitor 93 through an R.-C. filter consisting of resistor 94 and capacitor 95.

A modulated or input signal $E_m \cos(wt+m)$ is applied to a cathode follower tube 96 through a capacitor 97. The anode of tube 96 is connected to a B+ power supply through resistor 98. Grid bias is derived through a resistor 99 connected from the grid to the junction point of cathode resistors 100 and 101 which are connected in series between the cathode of tube 96 and ground. Output is coupled through a capacitor 102 and appears across a resistor 103 connected between capacitor 102 and ground. The junction point of capacitor 102 and resistor 103 is also connected to the midpoint of the secondary 85 of transformer $T_1$.

During the first cycle of carrier signal coupled through transformer $T_1$, a conducting path is established through the diodes when the anode of diode 87 is positive and the cathode of diode 88 is negative. This conduction charges the capacitor 89 to very nearly the peak value of the voltage appearing across the diodes. Of course, when the polarity of the voltage reverses the diodes will not conduct. Furthermore, during the next and all succeeding cycles of the carrier input, the diodes 87 and 88 will conduct only at the instant when the voltage on the anode of diode 87 reaches a positive value greater than that to which capacitor 89 is charged.

In operation, the arm 104 of potentiometer 92 is adjusted so that it and the mid-point 105 of transformer $T_1$ are at the same potential, that is to say, so that the circuit between points 104 and 105 is balanced to ground. During the brief portion of the cycle when the diodes conduct, capacitor 93 and resistor 103 are placed in parallel, and capacitor 93 will be charged to a voltage equal to the instantaneous value of the output signal of cathode follower 96.

Figure 12A:
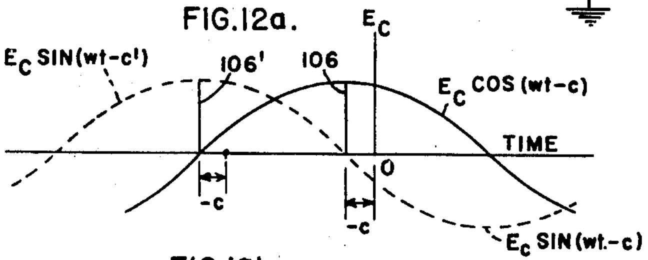
Figure 12B:
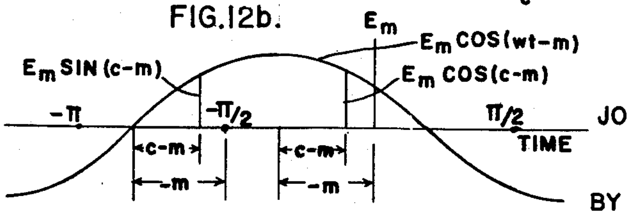

These voltage relationships are shown graphically in the waveform diagrams of Figures 12a and 12b. In Figure 12a the carrier input, $E_c \cos (wt-c)$ is shown as it appears across diodes 87 and 88. Of course, suitable adjustment must be made as, for example, by reversing transformer connections or using an equivalent sine wave input, to allow for the phase reversal of 180° in the input amplifier stage and 90° across the transformer. The input carrier is, for convenience, treated as being the carrier as it would appear across the diodes since this is the value of the carrier which determines the logical or mathematical effect of the operation of the stage. Electrically the carrier actually required at capacitor 75 may be either a sine or cosine term since suitable phase delay and circuit adjustment may be introduced in many different ways as will be obvious to those skilled in the art. As the circuit is shown in Fig. 11 a sine wave at capacitor 75 will produce a cosine wave at the diodes due to the net phase shift of 90° between these two points. In practice the circuit may be readily and accurately aligned by placing an input carrier voltage on capacitor 75 and a signal voltage having the same phase (or derived from the same source) on capacitor 97. If the input voltages are known to be exactly in phase, the net phase shift between capacitor 75 and the diodes will produce a 90° phase difference. A zero output across capacitor 93 then indicates that the circuit has been properly aligned. In Fig. 1 carrier inputs are indicated as the carrier required at the diodes rather than that actually applied to capacitor 75.

As shown in Fig. 12a, the maximum value $E_c$ of the carrier appearing on the diodes will occur at a time measured by phase angle $c$ which is shown for convenience as measured negatively from zero. Of course, the zero point of time may here be considered as the beginning point of any cycle after the first since as noted above, time is measured by angles modulo 360° that is, $wt$ equals $(wt+n\ 360°)$ where $n$ is any integer 0,1,2 . . . etc. In Fig. 12b the modulated signal $E_m \cos (wt-m)$ is similarly shown having a phase angle $m$. As noted above, the diodes will conduct during a brief interval of the cycle represented by the vertical bar 106 in Figure 12a. This occurs when the carrier has its maximum value and the magnitude of the modulated signal will therefore be sampled at this instant. As may be seen by reference to Fig. 12b, however, the value or amplitude of the modulated signal at this instant is $E_m \cos (c-m)$, since it is the instantaneous value of a cosine wave of maximum amplitude $E_m$ originating at an angle $(-m)$ and sampled at the angle $(c-m)$ along the wave. This is, therefore, the value to which the capacitor 93 is charged, and hence the value of the D.-C. output. Of course, if the phase difference $(c-m)$ changes, the value of the D.-C. output also changes. If as shown by the dotted line in Fig. 12a, the carrier on the diodes is a sine wave, the modulated signal will be sampled at a time indicated by the vertical bar 106' and, as shown in Figure 12b will have a value equal to $E_m \sin (c-m)$. In any case, the peak value of the carrier voltage should be large compared to the peak value of the signal or modulated voltage so that the latter will not affect the sampling time.

The phase detector circuit has been described in general terms since similar circuits are used at various points in the system. It will, of course, be understood that either a sine or cosine signal input, as desired mathematically, may be derived electrically from either a sine or cosine wave, the difference between the two electrically being merely a constant 90° phase difference for which circuit adjustment may readily be made as will be obvious to those skilled in the art. In practice such circuit adjustments are made stage by stage as the system is aligned.

It will be noted that the phase detector is used to derive a D.-C. output signal proportional to the product of the sine or cosine of the phase difference between its two A.-C. inputs, the carrier and signal voltages, times the amplitude of the input signal voltage. As will be seen below, when the carrier has a zero phase angle with respect to the phase of one of the outputs of the circle generator, i.e., when it is derived from the circle generator, a pair of phase detectors may be used to electrically instrument the mathematical process set forth in Equations 1a and 1b of taking $x$ and $y$ components of a vector quantity which is represented in polar form as the A.-C. signal input to the phase detectors.

The electrical instrumentation of the converse process of synthesizing a vector from its components will also be described in detail below. Essentially this process is performed by a pair of balanced modulators, the outputs of which are passed through an adder. By a balanced modulator is meant a device having an A.-C. output the amplitude of which is proportional to a D.-C. input signal and the frequency and phase of which are equal to those of an A.-C. carrier input. In practice this carrier input is also derived from the circle generator. Since the details of these processes will be further discussed below, vector quantities will, for the present, be discussed as such on the assumption that they can be represented electrically in either polar (A.-C.) or component (D.-C.) form and that the processes of resolving and synthesizing vectors can be carried out electrically through the use of phase detectors and balanced modulators using the circle generator voltages as reference carriers as stated above.

Returning now to Figure 1, the output of filter 27, $E_3 \cos (wt+\theta)$, is applied through amplifier 32 as the carrier voltage input of phase detector 33 which also has a velocity vector voltage, $\underline{V} \cos (wt+\phi)$, fed back from block 30 through an attenuator or potentiometer 33*a*, as its signal input. The output of phase detector 33 is a variable D.-C. voltage, A′, having a magnitude equal to $kV \cos (\theta-\phi)$, where $k$ is a scale factor or factor of portionality which may be adjusted by either or both potentiometers 33*a* and 33*b*. Amplifier 32 which, as noted, may be a two stage amplifier including an automatic gain control, is interposed between filter 27 and phase detector 33 since the variable magnitude filter output voltage is used to form the carrier input to the phase detector, and the carrier amplitude must be large by comparison to that of the modulated signal so that the modulating signal will not affect the sampling time.

It should be noted that the output A′ of the phase detector 33 is the directional error signal and is equal to $kV \cos (\theta-\phi)$. This value is independent of $E_3$, the variable amplitude of the filter output voltage, and depends only on scale factor $k$, the amplitude V of the constant amplitude velocity-vector voltage, and on the variable phase difference $(\theta-\phi)$, which gives a measure of the direction of the velocity vector relative to the direction of the curve. The distance error signal, A″, is derived from the output $E_3 \cos (wt+\theta)$ of filter 27 by a rectifier and comparator 34 to be described in detail below.

Figure 10A:
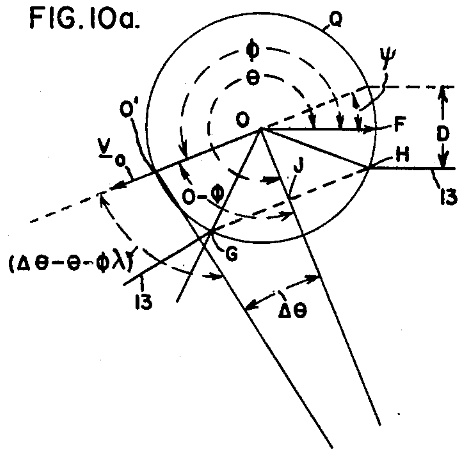
Figure 10D:
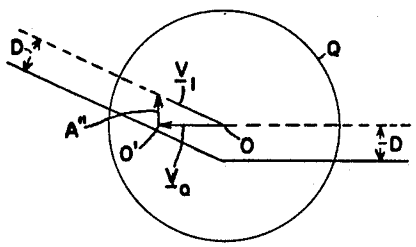
Figure 10B:
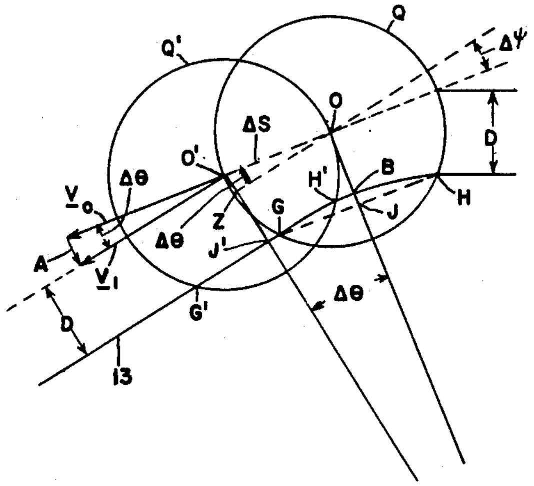

As shown in Fig. 10*a*, $\phi$ is the direction angle of the vector velocity $\underline{V_0}$ of the center O of search circle Q and $\theta$ is the direction angle of the normal to chord GH. Assuming that chord GH is a good approximation to curve 13 and that, as shown in Figures 10*a* and 10*b*, the center O of circle Q moves from an initial point 0 (having coordinates $p_{x0}$, $p_{y0}$) to a point 0′ in the direction of $\underline{V_0}$ parallel to that of chord GH, then the angular difference $(\theta-\phi)$ will initially equal 90°, and $\cos (\theta+\phi)$ will equal zero, thus making A′ zero. If A′ remains zero so that the direction of the velocity is not changed, and if the direction of the curve 13 deviates by an angle $\Delta\theta$ from that of the velocity vector $\underline{V_0}$ as center O moves a short distance $\Delta s$ to a point 0′, so also will the direction of chord GH and the direction of the new normal, O′N, deviate from the direction $\underline{V_0}$ and A′ will increase or decrease in proportion to the deviation, $\Delta\theta$.

Since the retention of charge by the capacitors in the integrators of the system inherently affords a "velocity memory" simulating the inertia of a particle, $\underline{V_0}$ will not change direction during the motion until some accelerating force is applied to it. Such a force is obtained by constructing an acceleration vector voltage which has an amplitude and polarity determined by the magnitude and sign of A, the sum of A′ and A″, and which is applied in quadrature with the velocity vector voltage.

Considering, for the moment, only the component A′ of signal A, if $\Delta\theta$ is such that, as shown in Figure 10*a*, the angle $(\Delta\theta+\theta-\phi)$ between $\underline{V_0}$ and the new normal, O′N, is between 90° and 270°, the cosine of $(\Delta\theta+\theta-\phi)$ is negative, reaching a minimum of −1 at 180°, and A′ is negative. If $(\Delta\theta+\theta-\phi)$ is between 90° and (−90°), the cosine is positive, reaching a maximum of +1 at 0°, and A′ is positive. If A′ is negative as in Fig. 10*a*, an acceleration vector leading the velocity vector by 90° in phase should be applied in order to cause the direction of the velocity to follow the direction of the curve. If A′ is positive, an acceleration vector lagging the velocity vector by 90° in phase should be applied in order to achieve the desired corrections. Of course, if desired, an inverter could be used after the phase detector to make the relationship between the polarity of A′ and the required lead or lag conform to the more usual sign convention. This is not, however, necessary to the equipment, since as shown in Fig. 1, A′ is immediately applied to an "operational" summing amplifier or adder 35 of the type commonly used in analog computers. These are high gain D.-C. amplifiers which, when used as adders, have resistive feedback and resistive input impedances and which will include a phase inversion or polarity reversal. It is the output, A, of this adder which determines the sign of the actual acceleration vector to be applied. As polarities are seen from the output of amplifier 35, A will be positive and the acceleration vector will therefore be leading the velocity vector when A′ is negative, i.e. when $(\Delta\theta+\theta-\phi)$ is greater than 90°; and A will be negative and the acceleration vector will be lagging the velocity vector when A′ is positive or when $(\Delta\theta+\theta-\phi)$ is less than 90°.

To obtain the other component of acceleration, A″, the voltage $E_3 \cos (wt+\theta)$ from filter 27 is rectified and compared to a small negative-polarity standard comparison voltage of fixed magnitude by a rectifier and comparator 34. The rectifier output, which is inherently positive, is the peak value of $E_3$ which, it will be recalled, equals $2E_1 (d/r)$. Since $d$ equals zero when center O is on curve 13 and has its maximum value when center O moves away until only one point on circle Q touches curve 13, the output of the comparator, which is the algebraic sum of the positive variable magnitude of $E_3$ and of the fixed negative comparison voltage, depends on the distance $d$ from the curve (as approximated by chord GH) to the circle's center O. The standard comparison voltage is adjusted to make this output zero for some small distance, D, less than the radius of the circle, and consequently negligible by comparison to the dimensions of curve 13. The distance D is shown geometrically in Figure 10*a* and diagrammatically in the voltage amplitude versus distance plot of Figure 10*g*.

Figure 10E:
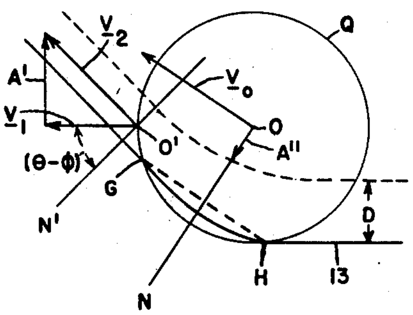
Figure 10C:
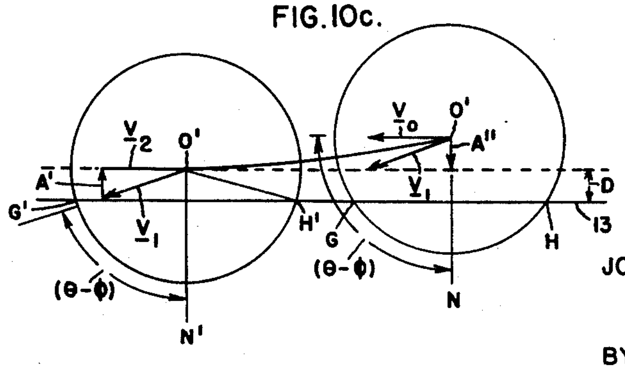
Figure 10F:
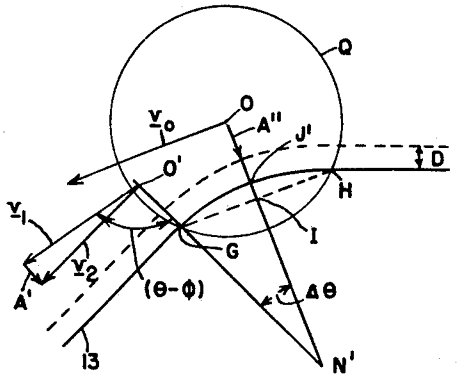
Figure 10G:
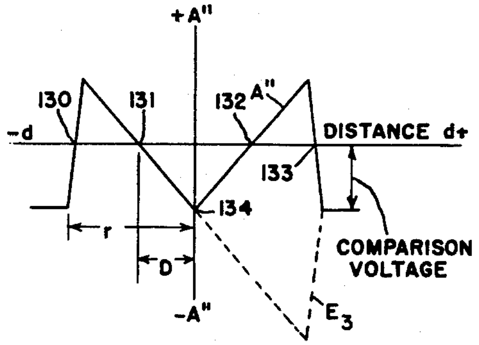

In Figure 10*g*, $d$ is considered negative when the circle is outside the curve along the negative normal of Figure 6. The amplitude of A″ is zero if $d$ is greater than $r$, the radius of circle Q. When intersection of the circle with the curve begins, the amplitude of $E_3 \cos (wt+\theta)$, and hence the amplitude of A″, rises sharply where the finite circle and curve widths overlap. $E_3$ decreases to zero at point 134 when the circle is centered on the curve. When the center of the circle crosses the curve, $E_3$ changes polarity (as shown by the dotted line marked $E_3$) and decreases to a negative minimum when the center of the circle is a distance $r$ inside curve 13. The rectifier, however, does not see the polarity change since it is in fact simply a 180° phase shift. The rectifier output will consequently have the form of the solid line marked A″. The zero level of the comparator output, A″, is shifted up to the axis marked "distance $d$" by the negative comparison voltage. Signal A″ from comparator 34 will be zero at point 131, which is the operating point presently being considered, and will increase or decrease as center O moves away from point 131.

It is apparent that the polarities in rectifier-comparator 34 are so arranged that if the absolute value or magnitude of $d$ is less than D, that is, if the center O is too close to the curve, A″ is negative. If $d$ is greater than D, that is, if O is too far away from the curve, A″ is positive. This output A″ is added to the output A′ of phase detector 33 by summing amplifier or adder 35 and the inversion in the summing amplifier will change the polarity of A″ as well as that of signal A′ from phase detector 33. To the rest of the system, however, the signal A″ is fully equivalent to A′ and simply calls for a leading or lagging component of perpendicularly applied acceleration. As may be seen from Figure 10$c$, if center O is too far away from the curve, a leading acceleration vector, A″, when applied to $\overline{V}_0$ will head center O toward the curve. However, A″ is then positive before inversion by adder 35 and negative after inversion, thus calling for a lagging acceleration vector. Consequently, either the rectifier connections and the polarity of the comparison voltage should be reversed, or, as shown in Figure 1, output from the comparator should be taken through an inverter before being applied to adder 35.

As may be seen in Figure 10$b$, when O moves to O′, the distance O′J′ will be greater than the distance OB. To the extent that chord GH is a good approximation for arc GH of circle Q, the segment OJ is a good approximation to OB, and the increase, $\Delta d$, of O′J′ over OB may be approximated by segment O′Z of normal O′N. The actual change in A″ is, of course, proportional to the actual change of O′J′ as compared to OJ. This change is indicated in Figure 10$b$, not to scale, but by standard methods of differential geometry. The manner in which the change in A″ above actually occurs may be seen more clearly for example in Figure 10$d$.

Returning to Figure 10$b$, and considering the distance traveled, O–O′, as $\Delta s$, then increment O′Z divided by $\Delta s$ is equal to the sine of $\Delta\theta$ which in turn is equal to the sine of $\Delta\psi$, the change in the direction angle of the curve. When the angular changes are small, as they will be when $\Delta s$ is small, the sine of the angle $\Delta\psi$ is good approximation to the rate of change of angle $\psi$ with respect to arc length $s$. Hence, when the system is tracking stably, the acceleration called for by A″ will be approximately proportional to the curvature K of curve 13 which, by definition, equals $d\psi/ds$ where $s$ is the arc length of curve 13. The degree of error in this first approximation is sensed by phase detector 33 which produces the directional error signal A′ which is added to A″ to give the actual magnitude of acceleration A, which is proportional to $d\psi/ds$, that is, to the curvature K of curve 13.

Furthermore, under transient errors such as shown for example in Figure 10$c$, the system tends to restore itself. The distance correction applied by A″ creates an angular error which is in turn sensed by A′ which then applies a restoring force. Of course the two actions actually blend and O moves smoothly along an exponential curve, such as solid line segment O–O′ in Figure 10$c$, to the dashed line a distance D from curve 13. Even though the two signals A′ and A″ arise simultaneously, the time constant of the circuit producing A′ may conveniently be made about one order of magnitude slower than the time constant of the circuit producing A″, and potentiometer 33$a$ and/or 33$b$ may then be adjusted to obtain the relative proportion between the maximum possible values of the signals A″ and A′ necessary to secure the critical damping action shown in Figure 10$c$.

In practice, the system can be made to track or follow a curve using only the distance error signal A″ if potentiometer 34$a$ is properly adjusted with respect to the scale factors of the rest of the system. In aligning the system, this adjustment of potentiometer 34$a$ with potentiometer 33$b$ set to zero is preferably made empirically to obtain the smoothest tracking possible using only signal A″ on a simple curve such as a circle. Signal A′ is then added in increasing amounts as, for example, by increasing the setting of potentiometer 33$b$ upwardly from zero until wholly stable tracking is obtained. The addition of the two signals affords smoother action and greater stability, particularly in the presence of extreme errors as will be seen in greater detail below.

It should be noted that, unlike signal A″, the output A′ of phase detector 33 could not be used alone as the sole error signal for the system of Fig. 1. The use of the rectifier and comparator 34 is necessary to cause the error voltage A to null when the center of circle Q is at a small distance D outside of curve 13 so that, when equilibrium is reached as a result of the servo action of the system, the amplitude $E_3$ of the voltage $$E_3 \cos (wt+\theta)$$

will not be zero (as it would be if the circle centered on curve 13), but rather will be equal in magnitude and opposite in polarity to the fixed comparison voltage. Of course, if amplitude $E_3$ goes to zero, indicating that the circle is centered on the curve, there is no carrier input to phase detector 33 and curve direction information is then momentarily lost until the resulting output of comparator 34 corrects the situation.

If one desires the search circle to move directly centered on the curve, one may, for example, use a system of the type disclosed and claimed in the copending application S.N. 618,553 of Charles W. Johnson, entitled "An Electronic Curve Follower," filed concurrently herewith and assigned to the same assignee as the present application. It is, of course, apparent that whether it is desirable to have the search circle ride directly centered on the curve or to ride at a slight distance away from the curve depends upon the particular application for which the system is intended.

In the system of Fig. 1, the magnitude of the sum A of error signals A″ and A′, which is the output of adder 35, represents the magnitude of the necessary correcting acceleration vector which must be applied perpendicularly to the velocity vector $\overline{V}$ to cause the circle Q to follow along the curve. The polarity of A indicates whether the acceleration vector should lead or lag the velocity vector. Of course, it will be understood that the initial velocity due to voltages $v_{xo}$ and $v_{yo}$ will not change until voltages representing a correcting acceleration are applied and that in general the velocity vector $\overline{V}$ remains unchanged when A is zero. In other words, due to the fact that the capacitors in the integrators retain their charge in the absence of input, the system has a "velocity memory" and the center of circle Q behaves like a particle having mass or inertia which will continue to move in a straight line unless acted upon by some external force. Voltages representing components of a correcting acceleration vector here correspond to such an external force.

It is desirable to apply this correcting acceleration vector perpendicularly to the velocity vector since it is well known that, if the accelerating force, $f$, acting on a particle of mass, $m$, moving in a curve of radius of curvature R, is always perpendicular to the direction of the velocity of the particle, the speed or absolute value V of the velocity of the particle is constant and the magnitude of the radial acceleration is inversely proportional to the radius of curvature R. In elementary Newtonian mechanics this is usually expressed by the equation:

$$f=\frac{mV^2}{R} \quad (8)$$

Since acceleration, A, equals force divided by mass, it follows that:

$$A=V^2/R \quad (9)$$

But curvature K, which is basically defined as $d\psi/ds$, that is, the rate of change of the direction angle of a curve along or with respect to its arc length, may also be shown to be equal to $1/R$, so that (9) may also be written in the form, (10*a*) $$A=KV^2$$

Since $V^2$ is here a constant, whereas A and K are, in general, variables along a curve, this may more conveniently be written, (10*b*) $$A=V^2K$$

Since the error signal A closely approximates the curvature K of curve 13, and since the center of circle Q is constrained to have a constant speed V, the damping feedback to phase detector 33 causes A′ to better the approximation of A″ to K in the sum A, and the acceleration vector voltage derived from signal A and applied at right angles to the velocity vector, leading it or lagging it according to the polarity of A, simulates a centripetal force $f$ applied to a particle moving along curve 13. The operation of the closed loop system then satisfies or solves the above Equation 10*b* along a line of motion determined by curve 13. Of course (8), (9) and (10*a*) are also thereby solved for values of A as K changes along curve 13. A more detailed description of the overall operation of the system based on the above described error sensing operation will be given below in connection with Figures 10*a*–10*g*.

The desired A.-C. acceleration vector A is constructed, electrically, by applying the variable D.-C. output, A, of adder 35 through a switch S3 to one input of a balanced modulator 36 having the voltage, $V\cos(wt+\phi)$, fed back from block 30 as its other, or carrier, input. For the purposes of this specification, a balanced modulator is defined, as noted above, as any device having one variable D.-C. input and one constant amplitude A.-C. carrier input, and having an output which is an A.-C. voltage the amplitude of which is modulated proportionally to the variable magnitude of the D.-C. input and the frequency and phase of which are equal to the frequency and phase of the A.-C. carrier input. If the D.-C. input changes polarity, the phase of the A.-C. output is shifted by 180°.

Balanced modulator 36 may, for example, consist of a modification of a circuit commonly known as the "Diamod" and shown in Figure 11.8 at page 398 of volume 19, "Waveforms," of the Massachusetts Institute of Technology Radiation Laboratory Series, McGraw Hill, 1949. The circuit shown therein is intended to accept pulse inputs. For the sine or cosine carrier wave operation specified herein, it is desirable to tune the carrier input transformer to resonance at the frequency of the carrier and feed it from a tuned amplifier. Best results have been obtained by using a transformer having a toroidal ferrite core and taking particular care in accurately locating the center tap thereof. The modulated output is, preferably, also taken through a tuned amplifier. The output of balanced modulator 36 is a voltage, $A\cos(wt+\phi)$, the amplitude of which is proportional to the D.-C. input A which is the magnitude of the desired correcting acceleration vector, but which is in phase with or parallel to, rather than perpendicular to, the carrier input representing the velocity vector $\overline{V}$. This voltage may be applied to a phase shifting network 37 which introduces a 90° phase lead (or 270° phase lag) to achieve the desired perpendicular relationship.

The output of network 37 is applied to a pair of phase detectors 38 and 39, which are similar to phase detector 33, and which have D.-C. outputs which represent the $x$ and $y$ components of the desired acceleration vector. This is accomplished by supplying a voltage, $E\cos wt$, from circle generator 21 as the carrier input to the diodes of phase detector 38 to which the voltage $A\cos(wt+\phi+90°)$ is applied as the signal input. Of course, the phase angle of the carrier input is here zero degrees. The D.-C. output of the phase detector is then a voltage $a_x$ equal to $A\cos(\phi+90°)$. As will be obvious from a consideration from Figures 10*a* and 5, this is the $x$ component of an acceleration vector perpendicular to the velocity vector $\overline{V}$. In a similar fashion phase detector 39 has an A.-C. voltage, $E\sin(wt)$, also derived from the circle generator 21, as its carrier input and has a D.-C. output voltage, $a_y$, equal to $A\sin(\phi+90°)$, which is the $y$ component of the acceleration vector. It should be noted that phase shifting element 37 could be placed in the carrier input line to balance modulator 36 or, alternatively, could be eliminated by inter-changing the carrier inputs to the phase detectors 38 and 39 which would then still have the same outputs stated above. Element 37 is shown merely for clarity of illustration.

It will be noted that the pair of phase detectors are here being used to obtain $x$ and $y$ components of a vector quantity in a set of orthogonal axes the orientation of which is determined by the outputs of the master oscillator that are used as carrier inputs to the phase detectors. In this type of application it is convenient to use a system of notation in which the input signal to the phase detector is always expressed as a cosine term. It is obvious that this involves no loss of generality since a sine wave expression can always be converted to an equivalent cosine term by subtracting 90° from the argument of the sine term and then writing it as a cosine term. If the carrier on the diodes of the phase detector is a cosine wave of zero phase, that is, derived from the master oscillator, it will have its positive maximum at the origin of a set of Cartesian coordinates or at time zero. If the cosine wave signal input has zero phase the two will coincide and the D.-C. output will be $E_m\cos(0°)$ or simply $E_m\times 1$ as it should be. If now the carrier wave remains fixed while the input signal progresses in phase positively along the $x$ axis, then it is apparent that the sampled value at any instant will be $E_m$ times the cosine of the signal input voltage's phase angle with correct polarity throughout all four quadrants. If the signal input is a cosine term and the carrier input is a sine wave derived from the master oscillator, a similar line of reasoning will show that the D.-C. output signal is $E_m$ times the sine of the signal input voltage's phase angle again with correct polarity throughout all four quadrants. The only difference is that the sampling will now occur at plus 90° along the $x$ axis rather than at the origin. It will further be noted that this explanation of the operation of the phase detector and that given earlier in connection with the description of the circuit are simply two equivalent ways of looking at the matter using slightly different conventions of notation. The basic point is that the phase detector shown functions as a four quadrant analog multiplication circuit or resolver which takes the product of the amplitude of its modulated input signal times a sinusoidal function of the angle of phase difference between its carrier signal and its modulated input signal. Where the magnitude of any vector quantity represented by the carrier is a constant, the phase detector functions to take the vector dot product of the vector quantities represented by the carrier input voltage and the signal input voltage.

The $x$ and $y$ components of acceleration, $a_x$ and $a_y$, from phase detectors 38 and 39 are applied to intergrators 40 and 41 respectively which, in accordance with Equation 4 above, will have outputs $v'_x$ and $v'_y$ representing correction or incremental components of velocity-vector $\overline{V}$. Integrators 40 and 41 may comprise "operational" or high gain D.-C. amplifiers with capacitive feedback and resistive input elements of the type commonly used in analog computers. Incremental velocity components $v'_x$ and $v'_y$ are applied to adders 42 and 43 respectively. These adders may be ordinary summing amplifiers and have, as their other inputs, voltages $v_{xo}$ and $v_{yo}$ respectively which are applied to them by bistable circuits or "flip-flops" 44 and 45 respectively. Flip-flops 44 and 45 are triggered to the desired output states by the output from pulse detector 18 when the search circle first encounters curve 13. Of course, potentiometers may be used to adjust their output magnitudes or, if desired, a pair of potentiometers having grounded center taps can be connected in parallel across a single flip-flop voltage source. Thus, at the same time that search sweep generators 20$a$ and 20$b$ are clamped to a fixed value, thereby stopping the original search motion of the center of the search circle, flip-flops 44 and 45 are triggered and apply arbitrarily selected small constant voltages, $v_{xo}$ and $v_{yo}$, to adders 42 and 43 as an initial velocity condition of the system. The center of the search circle therefore starts to move in an arbitrary direction, determined by the ratio of $v_{yo}$ to $v_{xo}$, which motion is corrected by feedback to block 28 in a manner to be more fully described hereinafter.

The outputs of adders 42 and 43 are, respectively, the sums of the $x$ and $y$ components of the initial velocity plus the $x$ and $y$ components of the corrective velocity necessary to make the circle follow along the curve. These outputs, $v_x$ and $v_y$, are applied respectively to a pair of balanced modulators 46 and 47, which are similar to balanced modulator 36, and which have, as their carrier inputs, voltage $E \cos (wt)$ and $E \sin (wt)$ which are derived from circle generator 21. The output voltage of balanced modulator 46 is an A.-C. voltage, $v_x \cos (wt)$, and the output voltage of balanced modulator 47 is an A.-C. voltage, $v_y \sin (wt)$. These outputs are applied to an adder 48 which, for example, may be a Y network of three resistors buffered from the balanced modulators by cathode follower amplifier stages, or which may be an operational summing amplifier.

By well known rules for the addition of voltage vectors which are at right angles to each other, as are the A.-C. inputs to adder 48, the amplitude V of the output voltage, $V \cos (wt+\phi)$, of the adder 48 will be equal to the square root of the sum of the squares of the amplitudes, $v_x$ and $v_y$, of the input voltages, and the phase angle $\phi$ of the output voltage will be equal to the angle whose tangent is equal to the ratio of $v_y$ to $v_x$. Of course, the frequency of the output voltage is the same as that of the two inputs which is determined by master oscillator 22$a$. It is apparent that, as noted above, the direction angle $\phi$ of the initial velocity will be determined by the ratio, $v_{yo}/v_{xo}$, of the magnitudes of the initial velocity condition voltages.

It will be noted that, by referring all phase relations to a carrier generated for the entire system by the master oscillator of a circle generator, a pair of phase detectors, such as 38 and 39, may be used to resolve a vector by obtaining D.-C. voltages representing the $x$ and $y$ componets of an input vector which is initially represented in polar form as an A.-C. voltage, the amplitude of which represents the magnitude and the phase angle of which represents the direction angle of the vector. Conversely, a pair of balanced modulators, such as 46 and 47, followed by an adder, may be used to synthesize a vector by deriving from D.-C. inputs representing components of a vector, an output which is an A.-C. or polar representation of the vector. Other operations, such as integration, may then be performed on whichever representation of the vector is electrically the most convenient for the particular operation desired. This electrical technique for converting from a component to a polar representation of a vector quantity is particularly well adapted to the needs of the present system, but may, of course, also be used generally in electronic analog computers of different overall design.

The output of adder 48 is applied to an automatic gain control amplifier 49 which has a portion of its output feedback to a rectifier and comparison circuit 50. Circuit 50 compares the amplitude of the voltage $V \cos (wt+\phi)$ with a manually adjustable D.-C. speed standard voltage, and has an output which is proportional to the difference between this amplitude V and the magnitude of the speed standard voltage. With switch S2 set on terminal 58, as shown, this output is applied as a bias to the A.G.C. amplifier 49, in such a manner as to hold the amplitude of its output voltage at a constant value determined by the magnitude of the speed standard voltage. The amplitude V, of course, determines the speed or absolute value of the velocity of the center of the search circle, which may thus be constrained or adjusted to any desired fixed value by adjusting the D.-C. speed standard voltage. This standardization or constraint of the magnitude of the velocity vector is one illustration of an operation which is more conveniently performed on a vector in the polar or A.-C. form of representation by contrast to the component or D.-C. form of representation which was used in performing the integration of the acceleration vector.

Of course, it should be understood that any equivalent circuit for controlling the amplitude of the voltage $V \cos (wt+\phi)$ may be used in place of amplifier 49. Clipper type circuits, for example, may be used if erroneous phase shifts in A.G.C. amplifier 49 become troublesome. As a still further alternative a balanced modulator of the type used at 46 and 47 may also be used in place of amplifier 49.

The A.-C. voltage output of amplifier 49, $$V \cos (wt+\phi)$$

is now a polar representation of the actual vector velocity of the center of search circle Q. This output is the feedback voltage which was applied as a signal to phase detector 33 and as a carrier to balanced modulator 36. The use of this voltage as a carrier for balanced modulator 36 ensures that (after a 90° phase shift by network 37) the acceleration vector will remain perpendicular to the velocity vector no matter how the direction of the latter may change. The use of the voltage $$V \cos (wt+\phi)$$

as signal feedback to phase detector 33 may be thought of as providing a measure of how close the approximation of signal A″ from comparator 34 is to the magnitude of the actual acceleration required to keep the system tracking. That is, A″ is a first approximation to the curvature which, if exact, would cause the system to track perfectly and A′ would always be zero. It will be recalled that $A'$ equals $kV \cos (\theta-\phi)$ where $\theta$ is the direction angle of the normal to the curve. Hence A′ adds to A″ a voltage proportional to the directional deviation of the velocity vector from the direction of the tangent to the curve. The sum A is then the required acceleration and is proportional to the instantaneous curvature, K.

The voltage $V \cos (wt+\phi)$ from amplifier 49 is also applied to a pair of phase detectors 52 and 53, which may be the same type as phase detectors 38 and 39, and which have as their outputs D.-C. voltages representing the components, $v_x$ and $v_y$, of the velocity vector. The phase detectors 52 and 53, of course, derive their carrier inputs, $E \cos (wt)$ and $E \sin (wt)$, from circle generator 21.

The outputs, $v_x$ and $v_y$, of phase detectors 52 and 53 are applied, respectively, to integrators 54 and 55. These integrators may be of the same type as integrators 40 and 41, and, in accordance with Equation 5 will have as their outputs, D.-C. voltages $\Delta p_x$ and $\Delta p_y$, which represent components of a corrective position vector having its origin at the fixed point $p_{xo}$, $p_{yo}$ and the tip of which traces out the perimeter of curve 13. When these corrective components are added to the fixed voltages $p_{xo}$ and $p_{yo}$ from the clamped search sweep generators 20$a$ and 20$b$, the sums will represent components of a position vector, $\underline{P''}$, drawn from the origin C at the center of tube 10 to the center of the search circle Q. This addition is performed in the $x$ and $y$ deflection amplifiers 25 and 26 which have as their outputs the voltages $p_x$ and $p_y$, respectively, the $x$ and $y$ components of the position vector $\underline{P}$ of the spot S. The correct relative polarity of the various voltages applied to amplifiers 25 and 26 may be insured by the manner of their connection, or, if desired, integrators 54 and 55 may be followed by inverters to compensate for the 180° phase shift in the integrators.

Of course, the outputs $p_x$ and $p_y$ of amplifiers 25 and 26 which are applied to the deflection plates of the cathode ray tube 10, also include the small search circle voltages applied to deflection amplifiers 25 and 26 from master oscillator 22*a* and phase shift element 22*b*. If one wishes to use the system as a function generator to obtain voltages representing the $x$ and $y$ coordinates of the curve 13 as functions of its arc length, $s$, the voltages $\Delta p_x$ and the clamped voltage $p_{xo}$ may be applied to an adder 56, and the voltages $\Delta p_y$ and the clamped voltage $\Delta p_{yo}$ may be applied to an adder 57. The outputs of these adders will then be the voltages representing the $x$ coordinate and the $y$ coordinate, respectively, of position vector P″ and will closely approximate the coordinates of the curve 13 as a parametric function of its arc length $s$.

The fact that these voltages are functions of the arc length follows from the fact that the speed or absolute value of the velocity along the curve has been held constant by the system. Since it is well known that speed equals distance or arc length divided by time, it follows that if the speed is held constant at a preselected fixed value, arc length, $s$, will be directly proportional to time, $t$, and the coordinate voltages, which vary as a function of time, will also be directly proportional functions of arc length $s$. Of course, it will be understood that the voltages, $x(s)$ and $y(s)$, which are the outputs of amplifiers 56 and 57 respectively, also could be obtained by applying the outputs of deflection amplifiers 25 and 26 to low pass filters which would not pass voltages having frequencies as high as that generated by the master oscillator 22*a*.

By either procedure the system takes input information plotted, for example, as is curve 13 on display means 12, in the form $y=f(x)$, and derives voltage outputs corresponding to the mathematical transformation of the equation of curve 13, from the form $y=f(x)$, into the parametric form $$(11) \qquad \begin{aligned} x&=x(s) \\ y&=y(s) \end{aligned}$$

The output voltages from adders 56 and 57 may, of course, be used for any desired purposes. If applied to the horizontal and vertical deflection plates respectively of a second or "monitor" cathode ray tube (not shown), they will cause curve 13 (increased in size by the small distance D) to be traced out on its screen.

Moreover, these voltages may be applied, for example, as inputs to conventional analog to digital converters. If the analog voltages are sampled at equal time intervals, the values read will represent coordinates of the curve at points spaced equal increments $\Delta s$ of arc length along the curve, rather than coordinates of points spaced at equal increments $\Delta x$ along the $x$ axis as would be the case if $x$ were the independent variable. The independent variable is $x$, for example, in systems where $x$ is generated by a linear sawtooth horizontal sweep. The outputs of converters used with the present system, which are digitally encoded representations of the functions (11), may then be applied to any convenient storage medium such as magnetic tape or punched cards. The stored information in turn may be used for any desired purpose such as programming an automatic machine tool to reproduce a part having the same shape as curve 13. Of course, either the digital or analog representations of the functions may also be applied as inputs to any other digital or analog, general or special purpose computer to obtain so-called "line" integrals around the curve 13 or a portion thereof, or for any other desired purpose.

It should also be noted that both the first and second derivatives of the voltages (11) with respect to arc length are available in the system in component form at the inputs to integrators 54, 55 and 40, 41, respectively, and in polar form at the outputs of A.G.C. amplifier 49 and balanced modulator 36, respectively. Furthermore, the output A of adder 35 is proportional to the magnitude of the curvature K of curve 13. Any of these voltages may be read out for any desired purpose as, for example, by meters or recorders 51, 60, and 63.

Returning now to a detailed consideration of the operation of the system, when the search circle first intersects hexagon 13, as, for example, at the corner 13*a*, sweep generators 20*a* and 20*b* are clamped and the initial condition velocity voltages $v_{xo}$ and $v_{yo}$ are gated on. If the television type of search raster is used, any curve no matter what its shape may be, will first be intersected at or near its highest point relative to the face of the cathode ray tube. If the top of the curve is a horizontal straight line, as in curve 13 of Fig. 1, the first intersection will be at the left end of this line. Even if the curve being read happens to come to a sharp point or cusp at its highest point, the search circle Q, which approximates the curve by the chord GH, will see some point where the direction of the chord GH is horizontal. Since the curve cannot bend upward on either side of its highest point and is not likely to change direction greatly within a distance equal to the radius of the search circle, it is reasonable to adjust $v_{yo}$ to some negative value the magnitude of which is small by comparison to that of $v_{xo}$. This adjustment is not critical but does serve to minimize the initial transient error. The polarity of $v_{xo}$ may be either positive or negative depending upon whether one wishes to initiate clockwise or counterclockwise motion around the curve.

It should be noted however, that the polarity relations in the error sensing portion of the system discussed earlier are such that counterclockwise motion of the center of the search circle around the outside of the curve is possible only at an operating point lying on the same line segment as does point 131 of Fig. 10*g*. At point 133, which lies on a line segment having the same slope as that on which 131 lies, counterclockwise motion around the inside of the curve is possible.

At points 130 and 132 respectively, or at similar points on the same line segments, clockwise motion around the outside or the inside of the curve, respectively, results. To determine which of these operating points will be used the triggering characteristics and sensitivity of flip-flop 19 and the time constant of pulse detector 18 may be adjusted in any convenient manner so that the center of the circle will initially be clamped on the particular line segment of the graph of Fig. 10*g* on which one desires to operate. For example, to pick up point 131, flip-flop 19 should require the maximum value of $E_3$ for initial triggering and the time constant of detector 18 should be such as to ensure response immediately after the peak of the curve A″ in Fig. 10*g* is passed.

In this manner the search circle Q may initially be clamped at a point on the line segment containing a point such as O, as shown in Figs. 10*a* and 10*b*, and given an initial velocity $V_0$. The operation of the system then proceeds in a manner to be described below to cause the distance $d$ to equal D and, as earlier described, to change the direction of $\underline{V}_0$ to that of $\underline{V}_1$ as the center of the circle moves from point O to point O′. Since $\underline{V}_1$ is now parallel to a straight line segment of curve 13 and since center O is at the fixed distance D from curve 13, both A′ and A″ become zero and so also, of course, does A. This action is consistent with the fact that the curvature of a straight line is zero. When the next corner is reached, a similar corrective acceleration vector having a magnitude proportional to the curvature at the corner will be applied to again change the direction of $\underline{V}$. Furthermore, it is apparent that if $v_{xo}$ and $v_{yo}$ were not originally so fortuitously chosen as to cause $V_0$ to initially be parallel to chord GH, similar correction signals A' and/or A" would immediately result and correct the transient error.

Also, if one increases the number of sides in the polygon, which is here shown as a hexagon, it will in the limit approach a circle. Since $d\psi/ds$ is constant for a circle, the output A will be a constant which is directly proportional to the curvature K and inversely proportional to the radius of curvature R of the circle. Although it is convenient to use circles of various known radii in the initial alignment and calibration of the system, it can be shown that the relations set forth in Equations 8, 9 and 10 above hold true generally for a curve of any shape. Reference is made, for example, to the book entitled "Advanced Mathematics for Engineers" by H. W. Reddick and F. H. Miller, second edition, page 318 et seq., published by John Wiley and Sons, New York, 1947.

Figs. 10*a* and 10*b* assume that the center O of circle Q is initially at the predetermined distance D from curve 13 as approximated by chord GH. In connection with these figures it has been shown above how the velocity may be caused to follow changes in the direction of the curve under these conditions. It has further been shown above in connection with Fig. 10*c* that if O is too far away from a straight line segment but $\underline{V}_0$ is parallel to the segment, error signal A" damped by error signal A' will result in correction of the displacement. Of course, if O is too close to a curve, the polarities of the quantities shown in Fig. 10*c* are simply reversed. This situation of being too close may arise either from an initial condition error or from a change in the direction of the curve. The latter case is shown in Fig. 10*d*, in conjunction with which it has been explained above how the distance error signal A" gives the primary measure of the change of curve direction when the system is tracking stably.

Suppose, however, that as shown in Fig. 10*e*, a displacement error exists at a point where the curve is also changing direction. Even though the initial velocity $\underline{V}_0$ is parallel to chord GH, the rectifier-comparator 34 will immediately sense the displacement error rather than the change in curve direction, and A" will initially be proportional to the distance of O from the dotted line a distance D from curve 13. The applied acceleration vector resulting from A" results in a new velocity vector $\underline{V}_1$ which clearly is not parallel to the new direction of the curve 13. However, phase detector 33 senses the angular error and the acceleration vector resulting from its output A' changes the direction of $\underline{V}_1$ to that of $\underline{V}_2$. Although, O' is still not at the distance D away from curve 13, the system now sees only an error of the sort already discussed in connection with Fig. 10*c*. This is, of course, corrected in the manner explained above. The situation illustrated in Fig. 10*e* is one example of how the output A' of phase detector 33 is used to damp out transient errors or to correct unusually large or abnormal directional errors other than those arising from a regular change in the direction of the curve being followed. Another example of a situation to which A' responds is that where the initial velocity is not parallel to the curve but has, for example, a direction such as that of the vector $\underline{V}_1$ in Fig. 10*e*. Thus if O' in Fig. 10*e* were the initial point at which the center of the search circle were clamped, the situation would be corrected as explained above.

Finally where a displacement error and a directional error are such, as shown in Fig. 10*f*, as to both require acceleration components of the same polarity for correction, the signals A' and A" may aid each other rather than damp or oppose each other. Thus in Fig. 10*f*, $\underline{V}_0$ is initially changed by an acceleration vector proportional to the error signal A" resulting from the displacement of O from the dotted line. The resulting velocity $\underline{V}_1$, however, is not parallel to curve 13 since the direction of the curve has also changed. This directional error is sensed by A' which applies an acceleration to $\underline{V}_1$ changing its direction to that of $\underline{V}_2$. $\underline{V}_2$ again presents the system only with an error of the type already discussed above in connection with Fig. 10*c*. Thus it is seen that in normal operation when the system is tracking stably the directional error signal A' merely serves as a damping factor which is applied to the distance error signal A". However, the directional error signal A' also serves to correct abnormally large or transient directional errors which would not be sensed by the distance error signal A". The damping function of A' is of particular importance where one is tracing extremely irregular curves that may involve a wide range of values of curvature or sudden changes in the value of the curvature. In such instances it is necessary to prevent overcorrection since, as noted above in connection with Fig. 10*g*, if the center of the search circle crosses the curve being traced, the polarity of $E_3 \cos (wt+\theta)$ reverses. If such a reversal of polarity occurs, it will, of course, result in instability of the system.

While an attempt has been made to set forth a theoretical explanation of the operation of the system to the best of our present belief and understanding, it should be understood that the invention is not to be limited by the theoretical explanation presented, since as a practical matter, if the apparatus is constructed and adjusted in accordance with the teachings of this specification, it will operate as a curve follower in the manner described above.

Furthermore, although various uses and applications of the system have been set forth above, it is to be understood that these are by way of example only and that many other applications also exist. For example, in the copending application of Charles W. Johnson and Paul Weiss, S.N. 618,606, entitled "Form Recognition System," filed concurrently herewith and assigned to the same assignee as this application, it is shown that the curvature K of any curve as a function of its arc length *s* is a property of the curve which is (1) invariant when the transformations of translation and rotation in the plane are applied to the curve and (2) semi-invariant under the transformation of magnification. By an invariant is meant a property of the curve the value of which, for a given point on the curve, does not change when the curve is subjected to transformations such as translation or rotation. That is, the curvature, for example, at a given point on curve 13 is the same no matter how stencil 12 is translated or rotated relative to the axes on the face of tube 10 even though the value of the position vector of the given point measured in these axes is changed by such motion. By a semi-invariant is meant a property of the curve which is changed only by a constant factor by the transformation being considered. Thus the curvature K is semi-invariant with respect to the transformation of magnification as well as invariant with respect to the transformations of translation and rotation. That is to say, the plots of curvature against arc length for two curves of the same shape but different sizes (one being a photographic enlargement of the other) will be the same except for a constant magnification factor.

It will be recalled, however, that the output A of adder 35 of the present system is directly proportional to curvature and may be recorded as by a meter 51 or any other convenient recording or storage medium. It is thus seen that this signal A may be used in a form recognition or character or document reading system of the type disclosed and claimed in the above noted copending application S.N. 618,606. The system as disclosed therein uses in exemplary fashion a photoelectric electromechanical curve follower the output voltages from which are applied to a computer which, in turn, derives from them properties, such as the curvature K of a curve, that are invariant or semi-invariant under the transformations of translation, rotation, and magnification. The values of the voltages representing these properties are then compared with stored values of the same property computed for known curves and a recognition is indicated when the computed and stored values coincide or otherwise have a predetermined relationship. If the electronic curve follower of the present invention is used in place of the electromechanical curve follower in the form recognition system of the above noted copending application, the voltage A, here shown as applied to a meter 51, directly represents one of the desired curve characteristics which may be compared with stored standard characteristics of known curves to automatically identify the curve. Moreover, the $x$ and $y$ coordinate voltages produced by the present curve follower may readily be sampled at equal time intervals by any convenient analog to digital converter. The digital outputs may then be used to compute any of the invariants or semi-invariants disclosed in the above noted copending application S.N. 618,606 by the methods taught therein.

Of course, the curve 13, which has been discussed as a hexagon for convenience of illustration, may in fact be a letter of the alphabet, a numeral, an outline on a map or photograph, a drawing of a part on a blue-print, or in general any other type of curve which one desires to read. Furthermore, other properties of the curve may, if desired, be computed or otherwise obtained from the values of the voltages representing the curve coordinates and the first and second derivatives thereof, which, as noted earlier, may be readily obtained in either component or polar form from the present electronic curve following system.

It should further be noted that in such an application of the system, the linearity of the cathode ray tube 10 with respect to the relationship between applied deflection voltage and the amount of resulting deflection, which has been assumed in explaining the operation of the system, is not in fact necessary to the result desired. Since the curve follower is in effect a closed loop or servo system it will track around a curve even though the cathode ray tube is not linear. It is only the accuracy of quantitative results obtained from any of the outputs which will be affected by non-linearity of the tube. In applications such as a form recognition system any quantitative inaccuracy of this type which may exist can be compensated for by preparing the stored standard data or characteristics of known curves from the same system or reading tube which will be used to read unknown material. Of course, as in any analog computer, the precision and quality of the results which can be obtained are determined by the precision and quality of the components used throughout the system. In particular, in order to maintain accurate phase relations, careful attention should be given to the components used in the phase detectors and balanced modulators, as will be obvious to those skilled in the art.

In still other applications of the system, one may wish to know what shape or coordinates an unknown curve must have in order that it may have a given known plot of curvature as a function of arc length. Such a problem is equivalent mathematically to the physical problem of determining what orbit or trajectory a particle of known mass will follow if it moves at constant speed and is subjected to a centripetal accelerating force which varies as a known function of time. In order to use the system of Fig. 1 to solve this type of problem, switch S3 is thrown from terminal 61 to terminal 62 to which a forcing function, $f_1(t)$, i.e. a direct current signal voltage having a variable magnitude representing the known variation of radius of curvature with arc length or, equivalently, of radial acceleration or accelerating force with time, is applied. When switch S3 is on terminal 62 the servo feedback loop of error information from stencil 12 is broken and the outputs of adders 56 and 57 (which may, if desired, be displayed on a separate monitor oscilloscope, not shown) are then determined by the nature of the forcing function $f_1(t)$ rather than by the nature of curve 13. Initial velocity conditions may be set in by independent or manual control of flip-flops 44 and 45 or, if desired, by replacing these flip-flops with any convenient voltage source. The resulting curve synthesized from $f_1(t)$ may then be observed, either on cathode ray tube 10 or, as noted above, on a similar tube to the deflection system of which the outputs of adders 56 and 57 are applied. Alternatively the outputs of adders 56 and 57 may be recorded or observed in any other convenient manner. It should be noted that in this type of application the use of circle generator 21 is still necessary to provide carriers or phase references for the system even though no feedback curve following error signal is derived from tube 10. If one wishes to impose the constant speed restraint with A.G.C. amplifier 49, switch S2 should be left on terminal 58. However, the output of amplifier 49 is also used as a carrier feedback to balanced modulator 36 in order to ensure a quadrature relationship of velocity and acceleration voltages. If, in other problems, one wishes to obtain merely the quadrature relationship without necessarily imposing a constant speed constraint, switch S2 may be thrown from terminal 58 to open terminal 59 thus removing the automatic gain control from amplifier 49.

Figure 15:
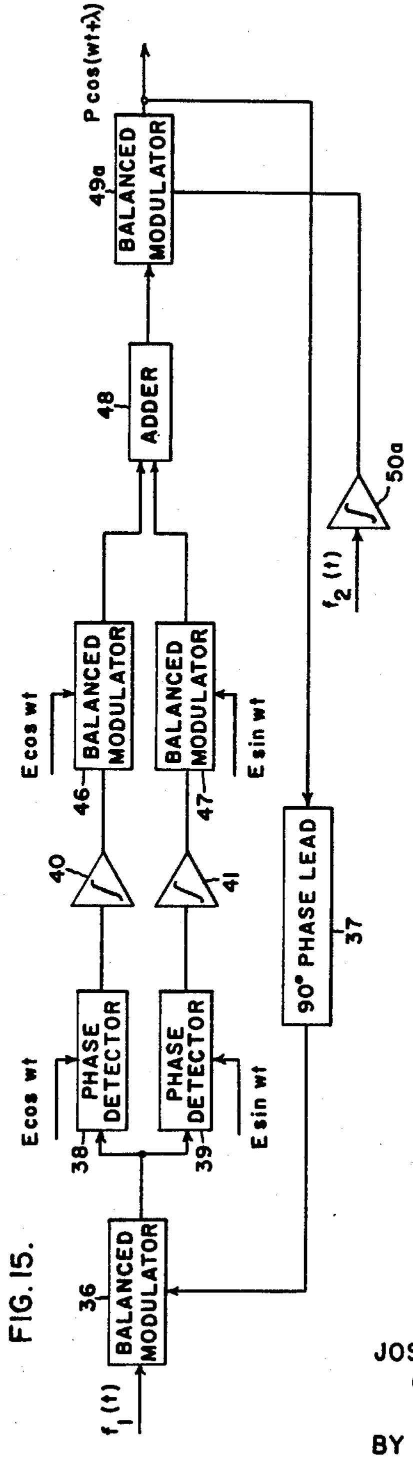
Figure 15 is a block diagram of a modification of a portion of the system of Fig. 1.

As a still further alternative, with switch S2 left on A.G.C. terminal 58, the D.-C. speed standard voltage applied to rectifier and comparator 50 may be derived, not from a battery or other constant voltage source as in the above applications where constant speed was desired, but rather as the output of an integrator such as used at 40 and 41. Such integrators are standard equipment in general purpose electronic analog computers with which the present apparatus may be used as auxiliary equipment. The input signal to such an integrator would then be a voltage signal $f_2(t)$, representing a tangential component of acceleration and producing the D.-C. speed standard voltage which represents the tangential component of velocity. When the system is operated at the slow speeds commonly used in general purpose analog computers it may be desirable to modulate the intensity of the electron beam of cathode ray tube 10 in order to prevent burning of the screen. Such precautions will, however, be obvious to those skilled in the art. In such an arrangement, when $f_2(t)$ is zero the D.-C. speed voltage is a constant, the initial value of which may be set into the integrator in the usual manner. As $f_2(t)$ varies positively the speed increases and as it varies negatively the speed decreases in accordance with the well known laws of Newtonian mechanics. It should further be noted that in this type of application the problem of accurate scale factors may be simplified if the D.-C. speed standard is directly applied as the signal voltage to a balanced modulator placed in the circuit as shown in Fig. 15 in place of A.G.C. amplifier 49 and rectifier and comparator 50. In either event the D.-C. speed standard controls the magnitude or absolute value of the output of block 30, but the use of a balanced modulator in place of A.G.C. amplifier 49 permits one to shift the phase of the output of block 30 by 180° in response to a negative D.-C. speed standard voltage. Since the output of block 30 is the velocity vector voltage, this phase shift reverses the direction of the tangential component of velocity which, in effect, reverses the direction of rotation of the polar coordinate position vector of the spot on the face of the cathode ray tube. Thus the trajectory of a particle may be simulated as a continuous motion involving positive and negative values of both acceleration and velocity.

It will futher be apparent that if integrators 54 and 55 are omitted from the circuit or, equivalently, are bypassed as by shorting their input and output terminals, and the outputs of phase detectors 52 and 53 are directly applied to the deflection amplifiers, then the A.-C. output of block 30 is a polar coordinate representation of a position vector rather than a velocity vector since one stage of integration has been omitted. It is interesting to note that in this case the roles of the D.-C. signals $f_1(t)$ and $f_2(t)$ are interchanged, as they should be, since the tangential component of velocity is orthogonal to the radial position vector.

The circuit used as suggested above is redrawn for convenience in Fig. 15 wherein like reference characters have been used to indicate components described in Fig. 1 and A.G.C. amplifier 49 has been replaced by balanced modulator **49*a* fed from an integrator 50*a* which replaces rectifier and comparator 50. Adders 42 and 43 may be omitted since initial condition values of the position vector may be set into the integrators of Fig. 15 by placing an appropriate charge on their capacitors. It will of course be understood that the balanced modulators 46, 47 and all phase detectors would be supplied with appropriate carrier voltages from circle generator 21 as in Fig. 1, and that the output $P \cos (wt+\lambda)$ would be applied to phase detectors 52 and 53** which would have their outputs directly applied to the deflection system of a cathode ray tube. So arranged the signal $f_1(t)$ obviously represents a tangential component of velocity and the signal $f_2(t)$ represents a radial component of velocity.

When both $f_1(t)$ and $f_2(t)$ are zero the spot remains stationary. If $f_2(t)$ is zero and $f_1(t)$ is not, the spot moves in a circle at a rate determined by the magnitude of $f_1(t)$ and in a direction determined by the polarity of $f_1(t)$. The center of the circle of motion is at the origin of the set of orthogonal axes determined by the deflection system of the tube. If $f_1(t)$ is zero and $f_2(t)$ is not, the spot moves along a radius of the circle at a rate determined by the magnitude of $f_2(t)$ and in a direction determined by the polarity of $f_2(t)$. Of course, any convenient limiter may be used if desired to limit the magnitude of $P \cos (wt+\lambda)$ to prevent overloading of the deflection system. Furthermore, if desired, the signals $f_1(t)$ and $f_2(t)$ may both be derived from a single D.-C. signal $f_3(t)$ through any suitable network the electrical characteristics of which will determine the desired relationship between its two output signals $f_1(t)$ and $f_2(t)$. If $f_1(t)$ and $f_2(t)$ are appropriately shaped and oppositely phased trains of rectangular waves, for example, the spot on the cathode ray tube will execute a sweep pattern similar to the type commonly used in Plan Position Indicator radar systems. With the present system, however, one has an independent control over the rate of change and accuracy of the angular and radial components respectively of such a sweep pattern. Of course, other types of patterns may be generated simply by changing the nature or waveform shape of the signals $f_1(t)$ and $f_2(t)$. In general the circuit affords a means of deriving an electrical signal which is a polar representation of a first vector quantity from first and second D.-C. signals which represent tangential and radial components of a second vector quantity which is the derivative with respect to time of the first vector quantity.

Figure 13:
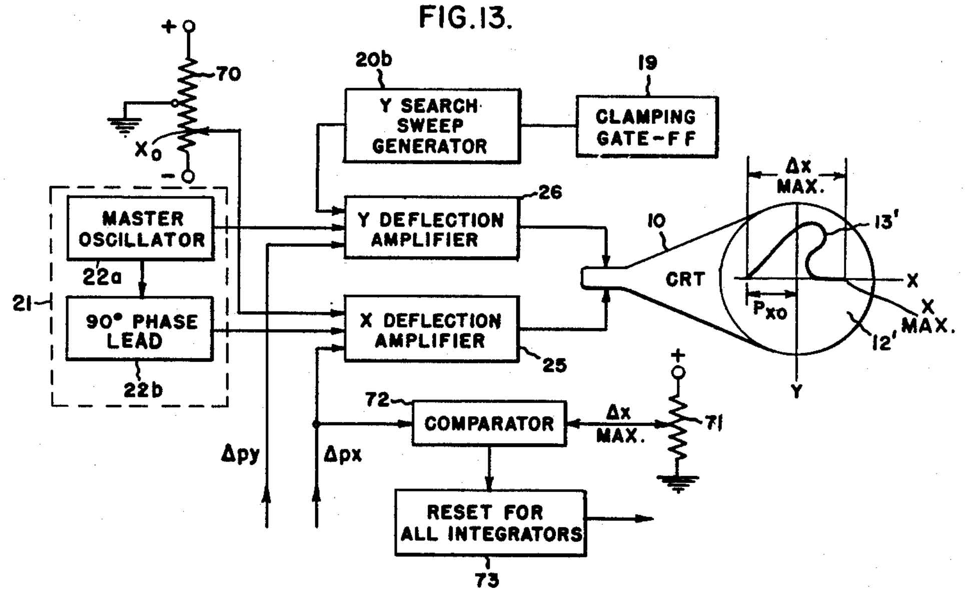
Figure 13 is a block diagram of additional circuitry which may be incorporated in the system of Figure 1 and which is particularly useful in following or reading open ended rather than closed curves.

Another more general way of looking at the matter is to note that if one desires to generate any analytic curve its equation should first be written in polar coordinates which we may here represent as P, λ and then transformed into a parametric representation such that P and λ are both functions of time as the independent variable. The signal $f_1(t)$ should then be such as to represent the values assumed by the partial derivative of λ with respect to time and the signal $f_2(t)$ should be such as to represent the values of the partial derivative of P with respect to time in order that the spot may start from a point on the curve determined by the initial conditions on the integrators and then trace out the desired curve. The voltages on the deflection plates of the cathode ray tube will then represent the $x$ and $y$ orthogonal coordinates of the curve as parametric functions of time whereas the voltage $P \cos (wt+\lambda)$ at the output of balanced modulator **49*a*** will be a polar representation of the curve as a function of time. The voltages on the deflection plates or the voltage $P \cos (wt+\lambda)$ may, of course, be operated upon stored, transmitted, or utilized in any desired manner for any desired purpose. At signal frequencies which can be linearly operated upon by the integrators, the system obviously affords, for example, an extremely flexible method of phase modulation. Of course, in order for the system to continue in operation indefinitely, the curve must be a closed curve unless some means, such as will be discussed below in connection with the tracing of open ended curves, are provided to resent the system after a desired range has been traced or generated. The above illustrative applications have been primarily concerned with tracing or simulating closed curves rather than open ended curves. The system of Fig. 1 used either as a follower or a generator may however, be readily adapted to deal with open ended as well as with closed curves. Additional apparatus for this purpose is shown in Fig. 13 wherein elements which are shown in and have previously been described in connection with Fig. 1 are indicated by the same reference character as was used in Fig. 1. Of course, it will be understood that in practice the additional elements of Fig. 13, like the connections for the alternate uses of the system of Fig. 1 suggested above, would be switch selectably included in the system of Fig. 1 in a manner which will be obvious to those skilled in the art. A separate Fig. 13 is used in the drawings merely for clarity of illustration.

In Fig. 13, cathode ray tube 10 is shown having a mask or stencil 12' placed upon its face bearing the curve 13' to be followed. Curve 13' is shown, by way of example, as approximating a non-linear resonance curve, but could also be any other curve which either does or does not double back upon itself. The curve 13' is shown plotted relative to the system of orthogonal $x$—$y$ coordinates having their origin at the center of the face of the tube 10. An initial value $x_0$ of the horizontal coordinate may be determined by a voltage derived from a potentiometer 70 having its midpoint grounded and having its opposite ends supplied with standard positive and negative voltages. The wiper arm of this potentiometer may be manually adjusted to pick off any desired initial voltage $x_0$ which may be applied to the $x$ deflection amplifier 25. A sawtooth vertical deflection voltage is then generated by the $y$ sweep generator **20*b*, the output of which is applied to $y$ deflection amplifier 26. When the spot of light which is swept vertically up and down at a fixed horizontal position $p_{xo}$ intersects the curve 13', the voltage derived from the pulse detector 18 of the system as shown in Fig. 1 triggers or actuates the flip-flop clamping gate 19 which stops the $y$ sweep generator and holds its output at the value $p_{yo}$ it has when the curve is first intersected. This value then remains as one input to the $y$ deflection amplifier 26**.

The curve is then traced out in the manner described in conjunction with the operation of the system of Fig. 1. However, when the voltage $\Delta p_x$ which is the output of integrator 54 in the system of Fig. 1, reaches a predetermined maximum value, which may be adjusted by a manual setting of the wiper arm of potentiometer 71, the comparator 72, which has this voltage $\Delta p_x$ and the voltage, $\Delta_x$ maximum, from potentiometer 71 as its two inputs, will emit a pulse. This pulse from comparator 72 is applied to circuits indicated by block 73 to reset all of the integrators 40, 41, 54 and 55 of the system of Fig. 1. These reset circuits may consist of any convenient means for grounding or otherwise discharging the capacitors of the integrators. When this happens the voltages $\Delta p_x$ and $\Delta p_y$ will, of course, become zero and the center of the search circle will return to the position $p_{x0}$, $p_{y0}$ determined by the voltages from potentiometer 70 and from the clamped *y* search sweep generator **20*b***. The cycle will then repeat as does the cycle of Figure 1. All other portions of the system may be the same as shown in Fig. 1.

In Figure 14 there is shown a schematic diagram of circuitry which may be used for clamping the sweep generators **20*a* and 20*b* of Figs. 1 and 13. Fig. 14 shows only the vertical sweep generator 20*b*, but it will be understood that a similar circuit may be used for the horizontal sweep generator 20*a* by making only suitable changes in component values to obtain the desired time constants in a manner well known in the art. Sweep generators 20*a* and 20*b* may be synchronized from any conventional pulse generator 110** the output of which is applied directly to the horizontal or *x* sweep generator **20*a*. The output of pulse generator 110 is also applied through any conventional count down circuit 111 to input terminal 112** of the vertical or *y* sweep generator **20*b*. The count down ratio, of course, results in the vertical sweep being slower than the horizontal sweep as is desired for the television type search raster in the operation of the system of Fig. 1. The pulses applied to terminal 112 serve as discharge pulses for a "boot-strap integrator" which includes a triode 115 to the grid of which these pulses are applied through a coupling capacitor 113. Triode 115 is biased negatively to cut-off through a resistor 114 and consequently is non-conducting except when a positive input pulse is applied. When tube 115 is cut off, capacitor 119 charges through diode 117, resistor 118 and diode 121, which are connected as shown in series with a source of B+ power and with capacitor 119, the other side of which is grounded. During the charging time, as the potential on capacitor 119 rises, the potential on the grid of cathode follower tube 116 also rises since it is connected to capacitor 119. Consequently, the output voltage across the cathode resistor 124 of cathode follower tube 123, which is connected in parallel with tube 116, also rises. Feedback capacitor 120, which is large by comparison to capacitor 119 and is connected from cathode resistor 122 of tube 116 to the junction point of diode 117 and resistor 118, serves to improve the linearity of the increase of the output voltage. When a positive pulse is applied at terminal 112, tube 115 becomes conducting and capacitor 119** discharges therethrough, thus creating the flyback portion of the sawtooth in the usual manner.

During this normal operation of the sawtooth generator the potential at output terminal 107 of flip-flop 19 (which may, for example, be a conventional Eccles-Jordan bistable circuit) holds the cathodes of diodes 108 and 109 at a large positive potential so that they are nonconducting. The forward resistance of diodes 117 and 121 is then a part of the charging resistance of capacitor 119 as noted above. However, when a triggering signal is received by flip-flop 19 from pulse detector 18, the potential at the output terminal 107 of the flip-flop is driven sufficiently negative to render diodes 108 and 109 conducting. The grid of tube 115 is thereby clamped to a negative potential so that discharge pulses from pulse generator 110 cannot render tube 115 conductive. At the same time the plate of diode 121 is also clamped to a negative value through diode 108 so that capacitor 119 is isolated. Since capacitor 119 has neither a charging voltage applied to it nor a discharge path, it retains the charge it had when flip-flop 19 was triggered and the output of cathode follower 123 is then fixed or clamped at the value $p_{y0}$ which it has at the point where the flying spot S first intersects curve 13.

Of course, it will be understood that a separate flip-flop circuit such as 19 is used for each of the *x* and *y* search sweep generators. In the type of operation described in connection with Fig. 1 these separate flip-flops may, however, be connected in parallel with the output of pulse detector 18. It will also be understood that when the tracing of a single curve has been completed for any desired purpose such as analysis or recognition, it is necessary to apply a reset pulse to flip-flop 19 as well as to the integrators of the system if one wishes to start the generation of another search sweep raster for the analysis of a new curve. This reset pulse may be applied either manually through a switch or automatically by any convenient means controlled by a recognition indication or by any automatic mechanism which may be used to position the curve display means for reading the next curve.

In practice initial position voltages are applied to deflection amplifiers 25 and 26, respectively, through single-pole, double-throw switches so that these initial position voltages may be selectively derived either from automatically clamped sweep generators of the type shown in Fig. 14 or from potentiometers such as potentiometer 70 of Fig. 13, depending upon the type of material being read and the type of operation desired in any particular application.

While the principles of the invention have now been made clear in an illustrative embodiment, there will be immediately obvious to those skilled in the art many modifications in structure, arrangement, proportions, the elements and components used in the practice of the invention, and otherwise, which are particularly adapted for specific environments and operating requirements, without departing from those principles. The appended claims are therefore intended to cover and embrace any such modifications, within the limits only of the true spirit and scope of the invention.

What we claim as new and desire to secure by Letters Patent of the United States is:

1. In an electronic analog computer adapted to operate on vector quantities, a master oscillator having a first sinusoidal voltage output, means to derive a second sinusoidal voltage of the same frequency as and differing in phase by 90° from said first sinusoidal voltage output; first and second direct current signal voltages representing orthogonal components of a first vector quantity in a set of orthogonal axes the orientation of which is established by said master oscillator; first and second balanced modulators having said first and second direct current voltages respectively applied thereto as signal inputs; means to apply said first and second sinuosoidal voltages to said first and second balanced modulators respectively as carrier input voltages; said first balanced modulator having an output which is an alternating current voltage having a frequency and phase equal to the frequency and phase of said first sinusoidal voltage and having a magnitude which is proportional to the magnitude of said first direct current signal voltage, said second balanced modulator saving an output which is an alternating current voltage having a frequency and phase equal to the frequency and phase of said second sinusoidal voltage and having a magnitude which is proportional to the magnitude of said second direct current signal voltage; means to add said output voltages of said first and second balanced modulators, the output of said adding means being a first alternating current signal voltage having a carrier frequency equal to the frequency of the output of said master oscillator, said first alternating current signal voltage being a polar representation of said first vector quantity, the magnitude of said voltage representing the scalar value of said first vector quantity, and the phase angle of said voltage measured with respect to a phase reference established by said master oscillator representing the direction angle of said first vector quantity in said set of orthogonal axes; means to apply said first alternating current signal voltage to a third balanced modulator as a carrier input voltage; said third balanced modulator having a third direct current signal input voltage, the output of said third balanced modulator being a second alternating current signal voltage having a magnitude proportional to said third direct current signal voltage and having a frequency and phase angle equal to the frequency and phase angle of said first alternating current signal voltage, said second alternating current signal voltage being a polar representation of a second vector quantity, the magnitude of said voltage representing the scalar value of said second vector quantity, and the phase angle of said voltage measured with respect to said phase reference established by said master oscillator representing the direction angle of said second vector quantity; means to derive fourth and fifth direct current signal voltages from said second alternating current signal voltage; and means to add said fourth and fifth direct current signal voltages to said first and second direct current signal voltages respectively.

2. Apparatus as in claim 1 including means to constrain the magnitude of said first alternating current signal voltage to a predetermined constant value.

3. Apparatus as in claim 1 wherein said means to derive fourth and fifth direct current signal voltages includes means to shift the phase angle of said second alternating current signal voltage with respect to the phase angle of said first alternating current signal voltage, whereby said second vector quantity has a magnitude proportional to said third direct current signal and a direction angle relative to said first vector quantity determined by said phase shifting means.

4. Apparatus as in claim 1 wherein said means to derive said fourth and fifth direct current signal voltages from said second alternating current signal voltage includes integrating means whereby the integral of said second vector quantity is vectorially added to said first vector quantity.

5. In an electronic analog computer adapted to operate on vector quantities, a master oscillator having a first sinusoidal voltage output, means to derive a second sinusoidal voltage of the same frequency as and differing in phase by 90° from said first sinusoidal voltage output; a balanced modulator having first and second input terminals, means for supplying to said first input terminal a first alternating current signal voltage having a frequency equal to the frequency of said master oscillator and having a phase angle measured with respect to a phase reference established by said master oscillator representing the direction angle of a vector quantity in a set of orthogonal axes the orientation of which is established by said master oscillator, means for supplying to said second input terminal a first direct current signal of variable voltage the magnitude of which is proportional to the scalar value of said vector quantity, the output of said balanced modulator being a second alternating current signal voltage having a magnitude proportional to the magnitude of said first direct current signal voltage and having a frequency and phase angle equal to the frequency and phase angle of said first alternating current signal voltage, first and second phase detectors each having said second alternating current signal voltage applied thereto, said first and second phase detectors also having said first and second sinusoidal voltages respectively applied thereto as carrier input voltages; said first phase detector having a second direct current output signal voltage the magnitude of which is proportional to the product of the magnitude of said second alternating current signal voltage times a sinusoidal function of the angle of phase difference between said second alternating current signal voltage and said first sinusoidal voltage, said second phase detector having a third direct current output signal voltage the magnitude of which is proportional to the product of the magnitude of said second alternating current signal voltage times a sinusoidal function of the angle of phase difference between said second alternating current signal voltage and said second sinusoidal voltage; said second and third direct current signal voltage outputs of said first and second phase detectors representing orthogonal components of a vector quantity in said set of orthogonal axes, said vector quantity having a scalar value proportional to the magnitude of said first direct current signal voltage and having a direction angle in said set of orthogonal axes equal to the phase angle of said first alternating current signal voltage.

6. In an electronic analog computer adapted to operate on vector quantities, a master oscillator having a first sinusoidal voltage output, means to derive a second sinusoidal voltage of the same frequency as and differing in phase by 90° from said first sinusoidal voltage output; first and second direct current signal voltages representing orthogonal components of a first vector quantity in a set of orthogonal axes the orientation of which is established by said master oscillator; first and second balanced modulators having said first and second direct current signal voltages respectively applied thereto as inputs, means to apply said first and second sinusoidal voltages to said first and second balanced modulators respectively as carrier input voltages; said first balanced modulator having an output which is an alternating current voltage having a frequency and phase equal to the frequency and phase of said first sinusoidal voltage and having a magnitude which is proportional to the magnitude of said first direct current signal voltage, said second balanced modulator having an output which is an alternating current voltage having a frequency and phase equal to the frequency and phase of said second sinusoidal voltage and having a magnitude which is proportional to the magnitude of said second direct current signal voltage; means to add the output voltages of said first and second balanced modulators, the output of said adding means being a first alternating current signal voltage having a carrier frequency equal to the frequency of the output of said master oscillator, said first alternating current signal voltage being a polar representation of said first vector quantity, the magnitude of said voltage representing the scalar value of said first vector quantity and the phase angle of said voltage measured with respect to a phase reference established by said master oscillator representing the direction angle of said first vector quantity in said set of orthogonal axes; means to constrain the magnitude of said first alternating current signal voltage to a predetermined value; first and second phase detectors each having said constrained alternating current signal voltage applied thereto, said first and second phase detectors also having said first and second sinusoidal voltages respectively applied thereto as carrier input voltages; the output of said first phase detector being a third direct current signal voltage the magnitude of which is proportional to the product of the magnitude of said constrained alternating current signal voltage times a sinusoidal function of the angle of phase difference between said constrained alternating current signal voltage and said first sinusoidal voltage, the output of said second phase detector being a fourth direct current signal voltage the magnitude of which is proportional to the product of the magnitude of said constrained alternating current signal voltage times a sinusoidal function of the angle of phase difference between said constrained alternating current signal voltage and said second sinusoidal voltage; said third and fourth direct current signal voltages representing orthogonal components of a second vector quantity in said set of orthogonal axes, said second vector quantity having the same direction angle as said first vector quantity and having a magnitude proportional to said predetermined value to which said first alternating current signal voltage is constrained.

7. Apparatus for simulating the motion of a particle along a trajectory determined by the action on said particle of a radial accelerating force as a function of time, said apparatus comprising, a master oscillator having a first sinusoidal voltage output, means to derive a second sinusoidal voltage of the same frequency as and differing in phase by 90° from said first sinusoidal voltage output; first and second direct current signal voltages representing the orthogonal components of the initial vector velocity of said particle in a set of orthogonal axes the orientation of which is established by said master oscillator; first and second balanced modulators having said first and second direct current voltages respectively applied thereto as signal inputs; means to apply said first and second sinusoidal voltages to said first and second balanced modulators respectively as carrier input voltages; a first adding means, means applying the respective outputs of said first and second balanced modulators as inputs to said first adding means, the output of said first adding means being a first alternating current signal voltage having a carrier frequency equal to the frequency of the output of said master oscillator, said first alternating current signal voltage being a polar representation of said initial vector velocity of said particle, the magnitude of said voltage representing the scalar value of said initial velocity, and the phase angle of said voltage measured with respect to a phase reference established by said master oscillator representing the direction angle of said initial velocity in said set of axes, first and second phase detectors each having said first alternating current signal voltage applied thereto, said first and second phase detectors also having said first and second sinusoidal voltages respectively applied thereto as carrier input voltages, the outputs of said first and second phase detectors being respectively third and fourth direct current signal voltages representing the orthogonal components of the vector velocity of said particles in said set of axes; first and second integrating means connected to integrate said third and fourth direct current signal voltages respectively; the outputs of said first and second integrating means respectively representing the orthogonal components of the position vector of said particle in said set of axes; a third balanced modulator, said third balanced modulator having said first alternating current signal voltage applied thereto as a carrier input voltage, a fifth direct current signal voltage the magnitude of which represents the magnitude of said radial accelerating force, said fifth direct current voltage being applied as a signal input to said third balanced modulator, the output of said third balanced modulator being a second alternating current signal voltage; third and fourth phase detectors each having said second alternating current signal voltage applied thereto, said third and fourth phase detectors also having said first and second sinusoidal voltages respectively applied thereto as carrier input voltages, and means to shift the phase angle of said second alternating current signal voltage by 90° with respect to the phase angle of said first alternating current signal voltage; the outputs of said third and fourth phase detectors being respectively sixth and seventh direct current signal voltages representing the orthogonal components of the vector acceleration of said particle in said set of axes; third and fourth integrating means connected to respectively integrate said sixth and seventh direct current signal voltages; second and third adding means connected to respectively add the outputs of said third and fourth integrating means to said first and second direct current signal voltages; and means to display the outputs of said first and second integrating means.

8. Apparatus for deriving an alternating current electrical signal which is an analog polar representation of a first vector quantity from first and second direct current signals, one of said direct current signals being a representation of the magnitude of the tangential component of a second vector quantity which is the derivative with respect to time of said first vector quantity, the other of said direct current signals being a representation of the radial component of said second vector quantity, said apparatus comprising, a master oscillator having a first sinusoidal voltage output, means to derive a second sinusoidal voltage having the same frequency as but differing in phase by 90° from said first sinusoidal voltage; first and second balanced modulators, means to apply said first direct current signal voltage to said first balanced modulator, means to apply a portion of the output of said second balanced modulator as a feed-back carrier input voltage to said first balanced modulator, first and second phase detectors each having the output of said first balanced modulator applied thereto as a signal input, means to apply said first and second sinusoidal voltages respectively to said first and second phase detectors as carrier input voltages; first and second means to integrate the outputs of said first and second phase detectors respectively; third and fourth balanced modulators having the outputs of said first and second integrating means respectively applied thereto as signal input voltages and having said first and second sinusoidal voltages respectively applied thereto as carrier input voltages; means to add the outputs of said third and fourth balanced modulators, means to apply the output of said adding means to said second balanced modulator as a carrier input voltage; a third integrating means having said second direct current signal voltage as an input, means to apply the output of said third integrating means to said second balanced modulator as a signal voltage, and means to shift the phase of the output of said first balanced modulator by 90° with respect to the phase of the output of said second balanced modulator, whereby the output of said second balanced modulator is a polar representation of said first vector quantity and the output of said first balanced modulator is a polar representation of said second vector quantity in a set of orthogonal axes the orientation of which is determined by said master oscillator.

9. In an electronic analog computer, first and second unidirectional signals representing the orthogonal components of a vector quantity; a master oscillator; means synchronized by said master oscillator for converting said first and second unidirectional signals to a first alternating current signal which is a polar representation of said vector quantity; means to constrain the magnitude of said first alternating current signal to a predetermined value to derive a second alternating current signal which is a polar representation of a second vector quantity; and means synchronized by said master oscillator to derive third and fourth unidirectional signals which represent the orthogonal components of said second vector quantity.

References Cited in the file of this patent

UNITED STATES PATENTS

| | | |
|---|---|---|
| 2,528,020 | Sunstein | Oct. 31, 1950 |
| 2,540,016 | Sunstein | Jan. 30, 1951 |
| 2,581,438 | Palmer | Jan. 8, 1952 |
| 2,681,764 | Gale | June 22, 1954 |
| 2,710,350 | Van Dijkum | June 7, 1955 |
| 2,715,182 | Bishop | Aug. 9, 1955 |
| 2,727,144 | Leyde et al. | Dec. 13, 1955 |
| 2,755,378 | Stover | July 17, 1956 |
| 2,786,629 | Piety | Mar. 26, 1957 |

OTHER REFERENCES

Electronics (Schlesinger et al.) pages 112–114, October 1952.